United States Patent
Ng et al.

(10) Patent No.: US 8,057,291 B2
(45) Date of Patent: Nov. 15, 2011

(54) FANTASY SPORTS CONFIDENCE SCORES

(75) Inventors: Brian Ng, Santa Monica, CA (US); Mark Kawakami, Burbank, CA (US); Jason Nako, Venice, CA (US); Ron Belmarch, Los Angeles, CA (US); Sean Montgomery, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 517 days.

(21) Appl. No.: 12/255,597

(22) Filed: Oct. 21, 2008

(65) Prior Publication Data

US 2010/0100204 A1  Apr. 22, 2010

(51) Int. Cl.
G06F 17/00 (2006.01)
(52) U.S. Cl. ............................................................ 463/9
(58) Field of Classification Search ................ 463/9–11, 463/16, 36–38, 42; 345/156–158, 173
See application file for complete search history.

(56) References Cited

U.S. PATENT DOCUMENTS

| | | | |
|---|---|---|---|
| 5,636,920 A | 6/1997 | Shur et al. | |
| 5,971,854 A | 10/1999 | Pearson et al. | |
| 6,041,266 A | 3/2000 | Nickerson | |
| 6,193,610 B1 | 2/2001 | Junkin | |
| 6,656,042 B2 | 12/2003 | Reiss et al. | |
| D491,956 S | 6/2004 | Ombao et al. | |
| D499,740 S | 12/2004 | Ombao et al. | |
| D510,362 S | 10/2005 | Minagawa et al. | |
| D538,295 S | 3/2007 | Noviello et al. | |
| D538,815 S | 3/2007 | Noviello et al. | |
| D538,816 S | 3/2007 | Noviello et al. | |
| D538,817 S | 3/2007 | Noviello et al. | |
| D538,818 S | 3/2007 | Noviello et al. | |
| D549,717 S | 8/2007 | Noviello et al. | |
| D550,233 S | 9/2007 | Vigesaa | |
| D550,241 S | 9/2007 | Viegers et al. | |
| D551,675 S | 9/2007 | Noviello et al. | |
| D554,653 S | 11/2007 | Noviello et al. | |
| D557,702 S | 12/2007 | Viegers et al. | |
| D558,213 S | 12/2007 | Noviello et al. | |
| D559,259 S | 1/2008 | Noviello et al. | |
| D559,260 S | 1/2008 | Noviello et al. | |

(Continued)

OTHER PUBLICATIONS

Anonymous. (2000). Y! Sports Screen Shot of Fantasy Baseball Home Page, 1 page.

(Continued)

*Primary Examiner* — Ronald Laneau
(74) *Attorney, Agent, or Firm* — James J. DeCarlo; Greenberg Traurig, LLP

(57) ABSTRACT

Methods, systems, and interfaces are provided for enabling a user to adjust confidence rankings of predictions of outcomes of fantasy sports games. The methods include causing display in a graphical user interface of an ordered list of at least two confidence score indicators, receiving selection of a first confidence score indicator and a second confidence score indicator selected from a first position and a second position, respectively, in the ordered list, moving the first confidence score indicator to the second position, moving the second confidence score indicator by at least one rank in the direction toward the first position to a third position, wherein the third position is adjacent to the second position, and moving one or more confidence score indicators located between the first position and the second position toward the first position, wherein the one or more confidence score indicators include a third confidence score indicator that moves from a position adjacent the first position to the first position.

32 Claims, 15 Drawing Sheets

U.S. PATENT DOCUMENTS

| | | |
|---|---|---|
| D569,869 S | 5/2008 | Chotai et al. |
| D571,373 S | 6/2008 | Loehr et al. |
| D572,717 S | 7/2008 | Loehr et al. |
| D579,943 S | 11/2008 | Clark et al. |
| D594,012 S | 6/2009 | Ng et al. |
| D594,464 S | 6/2009 | Ng et al. |
| 2002/0040253 A1 | 4/2002 | McNally et al. |
| 2005/0228780 A1 | 10/2005 | Diab et al. |
| 2006/0183548 A1 | 8/2006 | Morris et al. |
| 2006/0217198 A1 | 9/2006 | Johnson |
| 2007/0021165 A1* | 1/2007 | Ma et al. ............... 463/1 |
| 2007/0021167 A1* | 1/2007 | Ma et al. ............... 463/4 |
| 2007/0021214 A1* | 1/2007 | Ma et al. ............... 463/42 |
| 2007/0021853 A1* | 1/2007 | Ma et al. ............... 700/91 |
| 2007/0022029 A1* | 1/2007 | Ma et al. ............... 705/35 |
| 2007/0072679 A1* | 3/2007 | Kerns et al. ............ 463/42 |
| 2007/0185599 A1 | 8/2007 | Robinson et al. |
| 2007/0243917 A1 | 10/2007 | Wojewoda et al. |
| 2007/0243918 A1 | 10/2007 | Wojewoda et al. |
| 2008/0026804 A1 | 1/2008 | Baray et al. |
| 2008/0033840 A1 | 2/2008 | Upendran et al. |
| 2008/0096664 A1 | 4/2008 | Baray et al. |
| 2008/0102911 A1 | 5/2008 | Campbell et al. |
| 2008/0147575 A1 | 6/2008 | Roy |
| 2008/0153589 A1 | 6/2008 | Baray et al. |
| 2008/0155436 A1 | 6/2008 | Hirano et al. |

OTHER PUBLICATIONS

Anonymous. (Sep. 29, 2004). Y! Sports (ID#101) GMC Fantasy Baseball Plus Screen Shot, 1 page.

Non-Final Office Action mailed on Dec. 12, 2007, for U.S. Appl. No. 11/406,663, 7 pages.

U.S. Appl. No. 11/959,378, filed Dec. 18, 2007, for Ng et al.

U.S. Appl. No. 11/959,442, filed Dec. 18, 2007, for Ng et al.

* cited by examiner

Maximize your score by ranking your picks from most (32 points) to least confident (1 point).
To change a game's confidence level just drag and drop that row to a new point value.

| | BOWL | DATE | TEAMS | | | STATUS | CONFIDENCE POINTS |
|---|---|---|---|---|---|---|---|
| 132 | Champs Sp. | Dec 28 | ⊙ Boston Coll. | VS | ○ Michigan St. | | 32 |
| 131 | BCS Champ. | Jan 7 | ⊙ LSU | VS | ○ Oklahoma | | 31 |
| 130 | Fiesta | Jan 2 | ⊙ West Virginia | VS | ○ Ohio St. | | 30 |
| 129 | Orange | Jan 3 | ○ Kansas | VS | ⊙ Virginia Tech | | 29 |
| 128 | Rose Bowl | Jan 1 | ○ Illinois | VS | ⊙ USC | (2nd) | 28 |
| 127 | Outback | Jan 1 | ✓ Tennessee 21 | VS | Wisconsin 17 | Correct | 27 |
| 126 | Capital One | Jan 1 | ○ Michigan | VS | ⊙ Florida | | 26 |
| 125 | Sugar | Jan 1 | ○ Hawaii | VS | ⊙ Georgia | (1st) | 25 |
| 124 | Gator | Jan 1 | ⊙ Texas Tech | VS | ○ Virginia | | 24 |
| 123 | Humanitarian | Dec 31 | ⊙ Georgia Tech | VS | ○ Fresno St. | | 23 |
| 122 | | Dec 31 | ○ | VS | ⊙ | Unselected | 22 |
| 121 | Cotton | Jan 1 | ✓ Missouri 38 | VS | Arkansas 7 | Correct | 21 |
| 120 | Insight | Dec 31 | ○ Indiana | VS | ⊙ Oklahoma St. | | 20 |
| 119 | Emerald | Dec 28 | ⊙ Maryland | VS | ○ Oregon St. | | 19 |
| 118 | Chick-fil-A | Dec 31 | ⊙ Clemson | VS | ○ Auburn | | 18 |
| 117 | Liberty | Dec 29 | ○ UCF | VS | ⊙ Mississippi St. | | 17 |
| 116 | Papa John's | Dec 22 | ○ Southern Miss | VS | ⊙ Cincinnati | | 16 |
| 115 | Music City | Dec 31 | Kentucky 35 | VS | ✗ Florida St. 28 | Incorrect | 15 |
| 114 | Armed Forces | Dec 31 | ○ California | VS | ⊙ Air Force | | 14 |
| 113 | Sun | Dec 31 | ⊙ South Florida | VS | ○ Oregon | | 13 |
| 112 | New Orleans | Dec 21 | ⊙ Florida Atl. | VS | ○ Memphis | | 12 |
| 111 | Independence | Dec 30 | ⊙ Alabama | VS | ○ Colorado | | 11 |
| 110 | Poinsettia | Dec 20 | Utah 35 | VS | ✗ Navy 32 | Incorrect | 10 |
| 109 | Alamo | Dec 29 | ○ Penn St. | VS | ○ Texas A&M | Unselected | 9 |
| 108 | Meineke | Dec 29 | ○ Connecticut | VS | ⊙ Wake Forest | | 8 |
| 107 | Texas | Dec 28 | ○ TCU | VS | ⊙ Houston | | 7 |
| 106 | GMAC | Jan 6 | ○ Bowling Green | VS | ○ Tulsa | Unselected | 6 |
| 105 | Holiday | Dec 27 | ○ Arizona St. | VS | ○ Texas | Unselected | 5 |
| 104 | Motor City | Dec 26 | ○ Purdue | VS | ○ Cent. Michigan | Unselected | 4 |
| 103 | Las Vegas | Dec 22 | ○ UCLA | VS | ○ BYU | Unselected | 3 |
| 102 | International | Jan 5 | ○ Rutgers | VS | ○ Ball St. | Unselected | 2 |
| 101 | Hawaii | Dec 23 | Boise St. 38 | VS | ✗ East Carolina 41 | Incorrect | 1 |

| | BOWL | DATE | TEAMS | | | STATUS | | CONFIDENCE POINTS |
|---|---|---|---|---|---|---|---|---|
| | | 140 | 142 | 144 | | 146 | | 148 |
| 132 | Champs Sp. | Dec 28 | ⊙ Boston Coll. | VS | ○ Michigan St. | | | 32 |
| 131 | BCS Champ. | Jan 7 | ⊙ LSU | VS | ○ Oklahoma | | | 31 |
| 130 | Fiesta | Jan 2 | ⊙ West Virginia | VS | ○ Ohio St. | | | 30 |
| 129 | | | | | | | | 29 |
| 125 | Sugar | Jan 1 | Hawaii | VS | ⊙ Georgia | 1st | | 28 |
| 128 | Rose Bowl | Jan 1 | ○ Illinois | VS | ⊙ USC | 2nd | | |
| 127 | Outback | Jan 1 | ✓ Tennessee 21 | VS | Wisconsin 17 | Correct | | 27 |
| 126 | Capital One | Jan 1 | ○ Michigan | VS | ⊙ Florida | | | 26 |
| | | | | | | | | 25 |
| 124 | Gator | Jan 1 | ⊙ Texas Tech | VS | ○ Virginia | | | 24 |

FIG. 1C

| | BOWL | DATE | TEAMS | | | STATUS | | CONFIDENCE POINTS |
|---|---|---|---|---|---|---|---|---|
| | | 140 | 142 | 144 | | 146 | | 148 |
| 132 | Champs Sp. | Dec 28 | ⊙ Boston Coll. | VS | ○ Michigan St. | | | 32 |
| 131 | BCS Champ. | Jan 7 | ⊙ LSU | VS | ○ Oklahoma | | | 31 |
| 130 | Fiesta | Jan 2 | ⊙ West Virginia | VS | ○ Ohio St. | | | 30 |
| 129 | Orange | Jan 3 | ○ Kansas | VS | ⊙ Virginia Tech | | | 29 |
| 125 | Sugar | Jan 1 | ○ Hawaii | VS | ⊙ Georgia | 1st | | 28 |
| 128 | Rose Bowl | Jan 1 | ○ Illinois | VS | ⊙ USC | 2nd | | 27 |
| 127 | Outback | Jan 1 | ✓ Tennessee 21 | VS | Wisconsin 17 | Correct | | 26 |
| 126 | Capital One | Jan 1 | ○ Michigan | VS | ⊙ Florida | | | 25 |
| 124 | Gator | Jan 1 | ⊙ Texas Tech | VS | ○ Virginia | | | 24 |

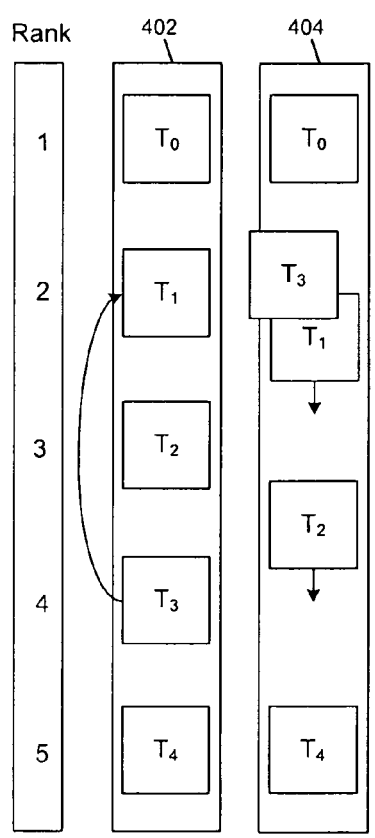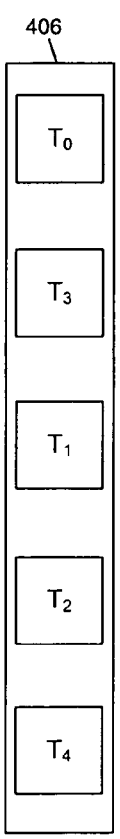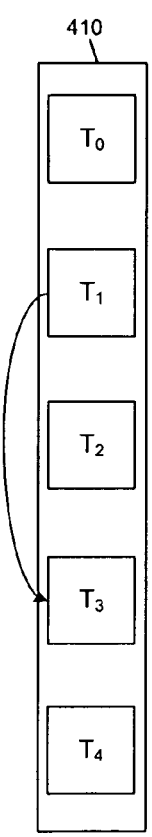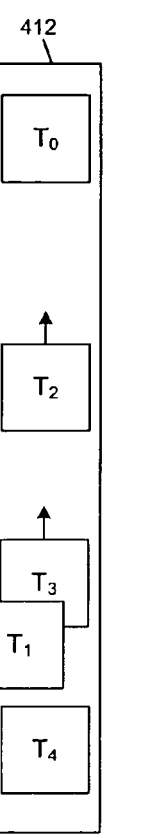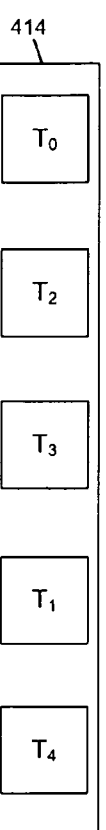
FIG. 4A					FIG. 4B

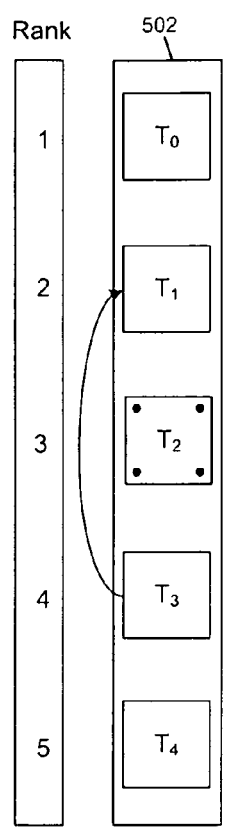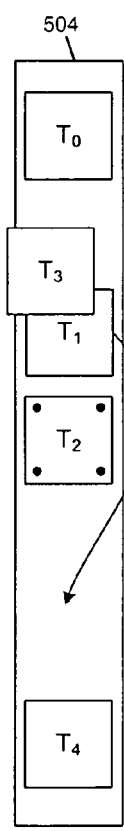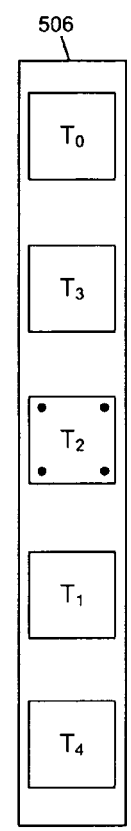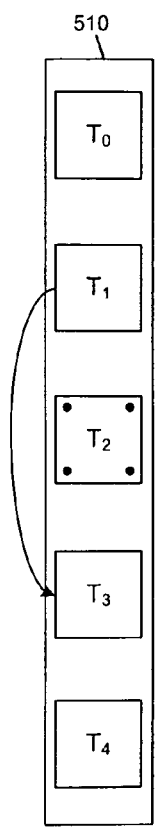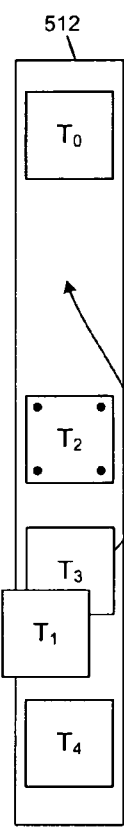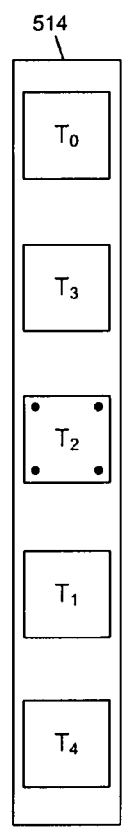
FIG. 5A            FIG. 5B

FANTASY SPORTS CONFIDENCE SCORES

BACKGROUND

1. Field

The present application relates generally to online fantasy sports games, and more particularly to assigning confidence values to predicted outcomes in online fantasy sports games.

2. Related Art

User interfaces for assigning confidence weights to predicted outcomes in fantasy sports games are known in the art. For example, in existing College Bowl "Pick 'Em" games, users predict which team will win an upcoming sports game, and users also specify their level of confidence in the prediction. A user specifies the confidence by assigning a weight value to a team in each upcoming game, where the weight value represents the user's confidence that the team will win the game. For example, a user may assign a weight value of 100 to indicate high confidence that the team will win the game, or a weight value of 1 to indicate low confidence. In that example, the predicted outcome is that a particular team will win a particular real-life college football game. Existing user interfaces for assigning these weight values are cumbersome, involve multiple user interface elements, leave multiple steps of the task to the user, and allow users to create inconsistent configurations that violate game rules. For example, existing interfaces may allow a user to assign the same confidence value to multiple teams although the game rules require a different confidence value for each team.

In existing confidence score games, such as the College Bowl Pick 'Em game, a list of match ups, e.g., games, is presented to the user. The user chooses a predicted winner for each match up, then assigns confidence points to each predicted winner. As introduced above, confidence points correspond to weights that range from low values to high values, where a higher value, e.g., 100 on a scale of 1 to 100, represents a high confidence and means that the user thinks the outcome is likely to occur, while a lower value, e.g., 1 on a scale of 1 to 100, represents a low confidence, and means that the user thinks the outcome is unlikely to occur. The user assigns a different confidence point value to each of one or more upcoming match ups. The user assigns the highest confidence point value to the match up (i.e., predicted outcome) for which the user is most confident in his or her prediction, the second highest confidence value to the match up for which the user is second most confident, and so on, with the lowest confidence point value being assigned to the match up for which the user is least confident.

Fantasy sports games are typically based on real-life sports games, such as football, baseball, hockey, and the like. However, the user's action of assigning confidence scores to outcomes (e.g., game results) may itself be a game, along with the selection of winners based upon the results of the subject games, e.g., as in the College Bowl Pick 'Em game. The assignment of confidence values may also be related to or part of a larger fantasy sports game in which the user performs other actions, such as selecting real-life players for fantasy sports teams.

SUMMARY

Existing user interfaces for assigning and modifying confidence ranking values are cumbersome and error-prone to use. In existing interfaces, changes to confidence rankings involve multiple user interactions, such as selections from multiple menus, and the user is responsible for maintaining consistency among selections from the menus.

Embodiments of the invention provide an interface for changing confidence rankings by moving ranking indicators displayed in a table of rankings. In a first aspect, the invention features a method of enabling a user to adjust confidence rankings of outcome predictions of fantasy sports games. The method includes causing display in a graphical user interface of an ordered list of at least two confidence score indicators, wherein each confidence score indicator is associated with a sports game, a predicted outcome of the game, and a rank that corresponds to a degree of confidence in the prediction, and wherein each confidence score indicator is displayed at a position that corresponds to the rank associated with the indicator. The method further includes receiving selection from the graphical user interface of a first confidence score indicator and a second confidence score indicator selected from a first position and a second position, respectively, in the ordered list; causing the first confidence score indicator to move to the second position; causing the second confidence score indicator to move by at least one rank in the direction toward the first position to a third position, wherein the third position is adjacent the second position; and causing one or more confidence score indicators located between the first position and the second position to move by at least one rank toward the first position, wherein the one or more confidence score indicators include a third confidence score indicator that moves from a position adjacent the first position to the first position.

Embodiments of the invention may include one or more of the following features. The method may further include fixing the ranking of a confidence score indicator that corresponds to a selected game, so that the ranking of the fixed confidence score indicator subsequently remains constant and does not change in response to subsequent changes of rankings of other confidence score indicators in the list.

BRIEF DESCRIPTION OF THE DRAWINGS

The present application can be best understood by reference to the following description taken in conjunction with the accompanying drawing figures, in which like parts may be referred to by like numerals:

FIGS. 1A-1C illustrate user interfaces for assigning confidence points to predicted outcomes of sports games in accordance with embodiments of the invention.

FIGS. 4A-4B illustrate re-ranking operations in accordance with embodiments of the invention.

FIGS. 5A-5B illustrate re-ranking operations with a fixed indicator in accordance with embodiments of the invention.

DETAILED DESCRIPTION

Figure 2A:
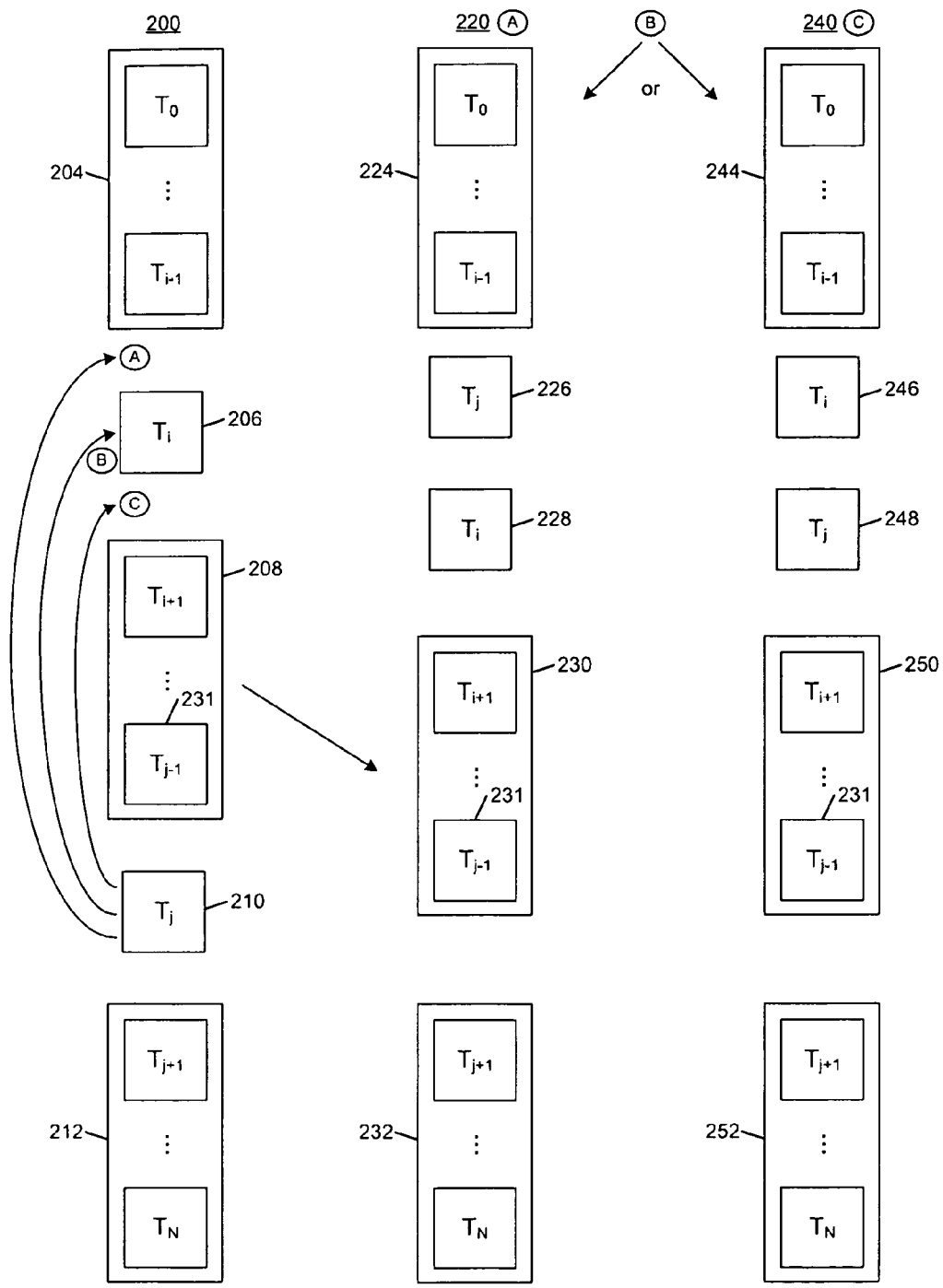
FIGS. 2A-2B illustrate indicator movement in accordance with embodiments of the invention.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

FIGS. 1A-1C illustrate user interfaces for assigning confidence points to predicted outcomes of sports games in accordance with embodiments of the invention. The user interface 100 illustrated in FIG. 1A may be displayed on a screen of a computer or other digital device such as a mobile phone, and may be implemented using computer-executable instructions. The user interface 100 of FIG. 1A includes user interface components, e.g., widgets, controls, or the like, that display a ranking table 101 that includes predicted outcome indicators 101 through 132. In one example, the user interface 100 is provided by a server computer, e.g., a web server (not shown), and downloaded via a computer network to a client computer, e.g., to a web client computer on which a web browser executes, displays web content, and receives user input. The user interface 100 is displayed in the web browser. The user interface may be implemented in other ways, e.g., as a standalone application independent of the browser. The user interface 100 may be implemented by computer program code in a programming language such as JavaScript™, Java™, C, or the like, or by a markup language document such as HTML. The code or document that represents the user interface 100 may be received, e.g., downloaded, from the web server and executed by the client computer, or may be executed by a server computer, in which case program code executing on the server may transmit display commands to the client.

The user interface components include input components that enable a user to adjust confidence score values (column 148) associated with predicted game outcomes. Note that the confidence points of the column 148 associated with a predicted game outcome 132 are displayed at a different vertical position than the other column values 140-146 of the outcome 132 for visual effect. In other examples, the confidence points 148 may be displayed at the same vertical position as the other column values 140-146. The table format, with rows and columns, is one example of how the predicted outcome indicators may be displayed, and other display formats are possible.

In one example, predicted game outcomes are expressed in terms of the team that is predicted to win a particular game, i.e., one of the two opposing teams in the teams column 144, which corresponds to a game named in the bowl column 140 to be played on the date indicated in the date column 142. The interface 100 displays predicted game outcome indicators 132 through 101 in an order based on the user's confidence in the accuracy of the predictions represented by the outcome indicators. The indicators 132-101 are sorted by a rank value associated with each indicator. The rank, represented by the confidence points column 148, corresponds to the user's confidence in the prediction, i.e., the user's confidence that the outcome represented by the outcome indicator will occur. For example, for a first game, to be played between the Boston College and Michigan State teams, the user may predict that the Boston College team is the expected winner of the game, as shown by the choice button next to Boston College's name in the predicted outcome indicator 132. If the user's confidence in that prediction is higher than his or her confidence in any other prediction, then that prediction is ranked above all other predictions. Note that the term "above" indicates that the user has more confidence in the prediction that is ranked above another prediction, and does not necessarily mean that the prediction ranked above another prediction is displayed above the other prediction according to the spatial meaning of the term above. Similarly, the term "below" refers to relative positions in a ranking relation, not a spatial arrangement. Continuing the example, if the user has also predicted that LSU will defeat Oklahoma in a second game, but the user is less confident in the prediction of the second game outcome than in the prediction of the first game outcome, the predicted outcome of the second game will be ranked below the predicted outcome of the first game. The first predicted outcome may have a rank of 1, and the second predicted outcome, in which the user has less confidence, may have a rank of 2. The rank is also referred to herein as a confidence value or confidence score, because the rank represents the user's confidence in the prediction. In FIG. 1A, the confidence score of an outcome indicator is equal to 33 minus the rank of the indicator in the example of FIG. 1A. The confidence score is equal to the rank in other examples described herein. Even if the confidence scores differ from their corresponding ranks, the confidence scores are at least based on the corresponding ranks.

Each predicted outcome indicator 132 may display the name 140 of a sports game, e.g., a college bowl game, or other information that identifies the game, e.g., the date 142 of the game, and the names of the teams 144 playing in the game.

The indicator 132 displays a predicted outcome of the game, which is ordinarily the predicted winner of the game, and may be displayed as, for example, a symbol near the name of the predicted winner (the partially filled-in circles in FIG. 1A), or by displaying the name of the predicted winner in a particular position within the indicator, e.g., as the first or leftmost team name in the indicator. In one example, the user may change the positions of outcome indicators 132 in the ranking to re-order, i.e., re-rank, the indicators. In another example, the confidence points 148 of some or all of the prediction indicators may be generated automatically, e.g., by a computer program, and the positions of the outcome indicators in the ranking may change to reflect such updated confidence points or rank values. The confidence points 148 associated with the predicted outcome indicator 132 are displayed in association with the indicator 132, and change based on the position of the indicator 132 in the ranking. For example, the top-ranked indicator 132 has 32 confidence points, which is the maximum number of confidence points assigned in a scenario with 32 teams in this example. The lowest-ranked indicator 101 has 1 confidence point, which is the minimum number of confidence points assigned in this example. The outcome indicators 132 may be, for example, rows in a table, as shown in FIG. 1A, or columns in a table, icons, graphical images, or any other graphical or textual representations of sports game outcomes.

In one example, initial rankings of the predictions are displayed on an initial screen, which may display an ordering of the predicted outcomes based upon rankings or confidence values previously provided by the user, or based upon a default ranking, such as predictions provided by another user or organization, or based upon the dates of the games, an automatically-generated ranking, or other criteria. A user's confidence in his or her predictions may change over time, so the user may change a confidence score of a first predicted outcome by selecting and moving a corresponding first predicted outcome indicator 125 to a second position, e.g., that of a second indicator 128, that corresponds to the user's new level of confidence in the first predicted outcome.

The method that implements re-ranking of predicted outcome indicators may be implemented by computer program code that interacts with computer program code for displaying the user interface 100. The re-ranking method is implemented by, for example, control logic such as software instructions that when executed by a processor in a computer system cause the processor to perform the method. The operation of the re-ranking method is described further herein with respect to the flow diagrams of FIGS. 8A and 8B. The re-ranking code and the user interface code may execute on the same computer, e.g., as part of the same program and operating system process, or as part of different programs and processes that interact via inter-process communication. The re-ranking code and the user interface code may alternatively execute in two different processes on two different computers, e.g., a server computer and a client computer, respectively, in which case the processes communicate via a computer network. In one example, the identities of the first predicted outcome indicator 125 and the second indicator 128 are received from the user interface. For example, a server executing computer program code that implements the methods described herein may receive the position of the first predicted outcome indicator 125 and the position of the second indicator 128 from the graphical user interface 100 (via a network if the user interface 100 and the method for re-ranking the confidence indicators are executing on different computers) in response to input received from a user. The method for re-ranking the confidence indicators may similarly transmit commands for causing the confidence indicators to be moved (e.g., drawn in different screen locations) from a server computer on which the method is executing to a client computer on which the user interface is displayed.

In one example, the predicted outcomes are displayed in a table format, sorted by rank, and the user selects the first predicted outcome 125, e.g., with a mouse click on the first indicator 125, as shown by the circled "1st" label, or via a drag and drop command, and moves the first predicted outcome 125 to a second position in the table that corresponds to a desired new rank 28, e.g., by selecting the second position or by dragging and dropping the first indicator onto the second position, shown as the circled "2nd" label. The second position is a region of the table that corresponds to the desired new rank 28. The second position may be, for example, a position in the table in which a predicted outcome indicator 128 for the new rank 28 is (or will be) displayed. That is, the term "position" is used herein to refer to a region of the user interface that corresponds to a rank. The term "position" is also used herein to refer to the rank itself, e.g., moving an indicator by two positions means increasing (or decreasing) the rank associated with the indicator by two ranking levels. In one example, moving may include graphical effects such as an animation effect in which the indicator appears to move from the first position to the second position. In another example, the display (including confidence scores) is updated every time the first match up moves over a different match-up while the user is dragging the selected match-up, and the new ranking produced by dropping the match-up on a particular other match-up is shown in the graphical user interface 100.

When a first indicator 125 is placed in a second position, the second position may already be occupied by an existing predicted outcome indicator 128, in which case a visual representation of the first indicator is inserted spatially between the existing indicator and one of the indicators 127, 129 adjacent to the existing indicator, either above or below the rank position of the existing indicator 128. In one example, as shown in FIGS. 1A and 1B, a user performs a "drag and drop" operation in a graphical user interface. The user first issues a drag command, e.g., by positioning a mouse pointer on a region of the first indicator, such as the region shown by the circle labeled 1st, and pressing a mouse button, to drag a first indicator 125 to a region of a second indicator 128 (e.g., the region shown by the circle labeled 2nd). The drag operation is illustrated by the arrow from the first indicator 125 to the second indicator 128. The user then invokes a drop operation, e.g., by releasing the mouse button, thereby causing the first indicator 125 to replace the second indicator 128 at rank 28. The rank of the first indicator 125 is then changed to 28. The second indicator 128 and subsequent indicators (127, 126 in this example) move downward by one rank. The rank of the second indicator 128 is changed to 27, and the ranks of indicators 127 and 126 are changed to 26 and 25, respectively. The result of the re-ranking process is shown in an updated table configuration 180 in FIG. 1C.

In one example, the choice of whether to insert the first indicator 125 in the ranking before or after the existing indicator is made based upon the region of the user interface on which the first indicator is dropped in a drag-and-drop operation, e.g., if the first indicator 125 is dropped in a region above (or on one side of) the existing indicator, then the rank of the first indicator is set to the rank 28 of the existing indicator 128, the rank of the existing indicator is decreased by one, and the ranks of indicators 127-126 (ranked between the first indicator 125 and the second indicator 128) are each decreased by one. Conversely, if the first indicator is dropped in a region below (or on a different side of) the existing indicator, then the first indicator's rank is set to the next rank after the existing indicator, and the ranks of indicators ranked between the first indicator 125 and the second indicator 128 are each decreased by one. In other examples, the insertion point may be determined based on user preferences instead of the screen position, or on other factors.

In one example, multiple prediction indicators may be selected and moved as a group. If multiple indicators are selected and moved, e.g., dragged and dropped, to a second position, each of the indicators is moved as described above, so that the indicators appear to move simultaneously as a group. For example, if a user selects a group that includes indicators 110, 109, and 108 (e.g., by holding down a shift key and selecting the three indicators via mouse clicks, or by drawing a rectangle around three indicators), then the three indicators are moved in sequence to new positions in the ranking table. A first one of the selected indicators, e.g., the highest-ranked, moves to the second position, and the other indicators move to new positions that are based on the relative distance between the original position of the first selected indicator and the original positions of the other indicators. In the case of indicators 110, 109, and 108, if the three indicators are selected, and the group is dragged and dropped to rank 15, then indicator 110 moves to rank 15, indicator 109 moves to rank 16, and indicator 108 moves to rank 17. In another example, if indicators 110, 108, and 105 are selected and the user requests that they be moved to new ranking starting at rank 26, then indicator 110 moves to rank 26, indicator 108 moves to rank 24, and indicator 105 moves to rank 21.

In one example, one or more indicators may be fixed, i.e., locked into a particular rank. If a destination rank, e.g., rank 26, is occupied by such a fixed indicator, then the move of a first indicator, e.g., indicator 110, to that destination rank will result in the first indicator being moved to a next available rank occupied by a non-fixed indicator nearest to the fixed indicator in the appropriate direction. Therefore, if fixed indicators are present, the phrase "move to rank" as used herein means that the indicator will be moved to the specified rank if the rank is not occupied by a fixed indicator, or to a closest available rank above or below the specified rank, where the closest available rank is not occupied by a fixed indicator. The term "closest available position" relative to a given position (i.e., to a given rank) is used herein to refer to the non-fixed indicator that is the least number of positions distant from the given indicator. For example, if rank 1 is occupied by a non-fixed indicator A, ranks 2 and 3 by fixed indicators B and C, and rank 4 by a non-fixed indicator D, then the position of indicator D (rank 4) is the closest available position to A.

The table 100 may have any spatial orientation, but is described herein as having entries arranged in a vertical sequence, so that different predicted outcome indicators appear at different vertical positions. In one example, the predicted indicators are displayed as rows 132 to 101 in a table, so that higher-ranked indicators are displayed closer to the spatial top of the table, and lower-ranked indicators are displayed closer to the spatial bottom of the table. In another example, the indicators are sorted in a reverse order, so that higher-ranked indicators are displayed closer to the spatial bottom of the table, and lower-ranked indicators are displayed closer to the spatial top of the table. In one example, the ranking numbers may increase from most confident to least confident, and in another example, as shown in FIG. 1A, the ranking numbers may decrease from most confident to least confident.

Figure 2B:
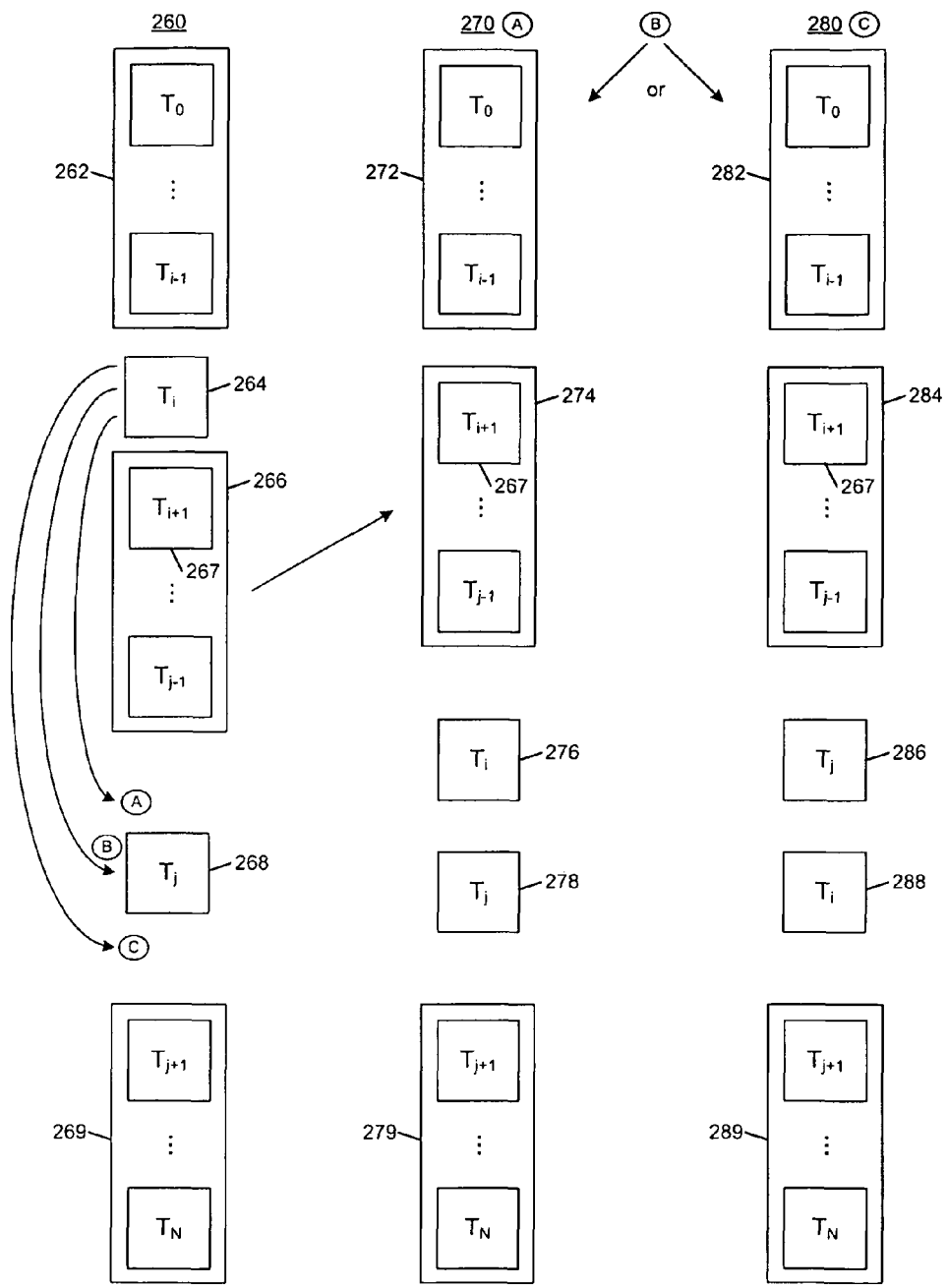

FIGS. 2A-2B illustrate indicator movement in accordance with embodiments of the invention. FIG. 2A illustrates the case in which a first indicator $T_j$ 210 in a table 200 is moved from a first position to a higher-ranked second position, i.e., the initial rank of the first indicator is greater than the initial rank of the second indicator. In FIG. 2A, the second position corresponds to the position of a second indicator $T_i$ 206. The table 200 may include a first sequence of indicators 204 (represented as $T_0 \ldots T_{i-1}$), a second indicator 206 ($T_i$), a second sequence of indicators 208 ($T_{i+1} \ldots T_{j-1}$), a first indicator 210 ($T_j$), and a third sequence of indicators 212 ($T_{j+1} \ldots T_N$). Note that first sequence 204, the second sequence 208, and/or the third sequence 212 are optional. For example, indicator $T_i$ 206 may be the highest ranked indicator, in which case the first sequence 204 is not present. In another example, $T_j$ may be the lowest-ranked indicator, in which case the third sequence 212 is not present. If the second sequence is not present, i.e., there are no intervening indicators between the second indicator 206 and the first indicator 210, then the re-ranking operation shown by the arrows from the first indicator 210 to the second indicator 206 swaps the first indicator 210 with the second indicator 206. In FIG. 2A, the highest-ranked indicator $T_0$ appears at the top of the table 200, and the lowest ranked indicator $T_N$ appears at the bottom of the table 200. The highest-ranked indicator, $T_0$, has a rank=0, the second-highest-ranked indicator, which is the next indicator below $T_0$ (not shown) has a rank=1, and the lowest ranked indicator $T_N$ has a rank=N.

In one example, a user changes the ranking of the first indicator $T_j$ 210 (i.e., ranking=j) to the ranking initially assigned to the second indicator $T_i$ 206 (i.e., ranking=i) by selecting the first indicator 210, e.g., in a drag and drop operation or by selecting the first indicator 210 with a mouse or other input device, moving the first indicator 210 to the spatial region of the second indicator 206, i.e., the region between the first sequence 204 and the second sequence 208, and completing the drag and drop operation, e.g., by releasing a mouse button, or by selecting the region of the second indicator with the mouse or other input device. In response to selection of the first and second indicators, the ranking of the first indicator 210 is changed from rank j to rank i (or to i+1 or i−1 depending on the system configuration and/or the position at which the first indicator 210 is dropped or placed).

The first indicator 210 then disappears from its initial position between the second and third sequences, and appears at or near the position of the second indicator 206. The first indicator's rank may be changed to rank i (the second indicator 206 $T_i$'s initial position) or rank i+1 (the next rank below the second indicator's initial position). The choice between rank i a rank i+1 may be based on, for example, the position at which the first indicator 210 is dropped or placed, or on a user configuration option, or on some other criteria, as described above. For example, the indicator 210 may move to rank i if it is dropped at a position A between the lowest-ranked indicator of the first sequence 204 and the second indicator 206 or at a position B on the second indicator 206. In those cases, the result of dropping the indicator at position A or B is shown as the second table 220. In another case, the indicator 210 is moved to rank i+1 if it is dropped or placed at a position C between the second indicator 206 and the highest-ranked indicator of the second sequence 208. The latter case is shown as the third table 240. If the indicator 210 is dropped at position B, i.e., onto the second indicator 206, or at a position approximately equidistant between two indicators (e.g., $T_{i-1}$ and $T_{i+1}$), then the result may be either the arrangement of table 220 or 240, depending on, e.g., a configuration option or a user preference setting, or some other value.

In the case where the first indicator's rank is changed to rank i, the first indicator (labeled $T_j$ in FIG. 2A), is displayed at the initial position of the second indicator $T_i$ 206, as shown in a second table 220. The ranks of the intervening indicators (i.e., the indicators between a second position defined by the initial position of the second indicator $T_i$ and a first position defined by the initial position of the first indicator $T_j$) are increased by one ranking level, so that the intervening indicators move down by one position, as shown in the second table 220.

In the table 220, the first indicator $T_j$ 226 occupies the position with ranking=i previously occupied by the second indicator $T_i$ 206, and the newly-positioned second sequence 230 occupies rankings one level lower (i.e., one value greater) than the initially-positioned second sequence 208. In another example, shown in table 240, the first indicator $T_j$ 248 occupies a position one level below the initial position of the second indicator 206, as described above with reference to table 240. The lowest-ranked indicator $T_{j-1}$ 231 of the second sequence 230, which is also referred to herein as a third indicator, now occupies (in the second table 220 and the third table 240) the initial position of the first indicator $T_j$ 210, i.e., the first position, at ranking=j, which was vacated by the first indicator.

FIG. 2B illustrates the case in which a first indicator $T_j$ 264 is moved from a first position to a lower-ranked second position, i.e., the initial rank of the first indicator is less than the initial rank of the second indicator. The second position corresponds to the position of a second indicator $T_i$ 268. A table 260 may include a first sequence of indicators 262 (represented as $T_0 \ldots T_{i-1}$), a first indicator 264 ($T_i$), a second sequence of indicators 266 ($T_{i+1} \ldots T_{j-1}$), a second indicator 268 ($T_j$), and a third sequence of indicators 269 ($T_{j+1} \ldots T_N$). As in FIG. 2A, the first sequence 262, the second sequence 266, and/or the third sequence 269 are optional. For example, the first indicator $T_i$ 264 may be the highest ranked indicator, in which case the first sequence 262 is not present. In another example, the second indicator $T_j$ may be the lowest-ranked indicator, in which case the third sequence 269 is not present. If the second sequence 266 is not present, i.e., there are no intervening indicators between the first indicator 264 and the second indicator 268, then the re-ranking operation shown by the arrows from the first indicator 264 to the second indicator 268 swaps the first indicator 264 with the second indicator 268. In FIG. 2B, the highest-ranked indicator $T_0$ appears at the top of the table 260, and the lowest ranked indicator $T_N$ appears at the bottom of the table 260. The highest-ranked indicator, $T_0$, has a rank=0, the second-highest-ranked indicator, which is the next indicator below $T_0$ (not shown) has a rank=1, and the lowest ranked indicator $T_N$ has a rank=N.

In one example, a user changes the ranking of the first indicator $T_i$ 264 (i.e., ranking=i) to the ranking initially assigned to the second indicator $T_j$ 268 (i.e., ranking=j) by selecting the first indicator 264, e.g., in a drag and drop operation or by selecting the first indicator 264 with a mouse or other input device, moving the first indicator 264 to the spatial region of the second indicator 268, i.e., the region between the second sequence 266 and the third sequence 269, and completing the drag and drop operation, e.g., by releasing a mouse button, or by selecting the region of the second indicator with the mouse or other input device. In response to selection of the first and second indicators, the ranking of the first indicator 264 is changed from rank i to rank j (or to j+1 or j−1, depending on the system configuration and/or the position at which the first indicator 264 is dropped or placed).

The first indicator 264 then disappears from, i.e., vacates, its initial position between the first and second sequences, and appears at or near the position of the second indicator 268. The first indicator's rank may be changed to rank j (the second indicator 268 $T_j$'s initial position) or, in other examples, to rank j+1 (the next rank below the second indicator's initial position). The choice between rank j and rank j+1 may be based on, for example, the position at which the first indicator 264 is dropped or placed, or on a user configuration option, or on some other criteria, as described above. For example, the indicator 264 may move to rank j if it is dropped at a position A between the lowest-ranked indicator of the second sequence 266 and the second indicator 268 or at a position B on the second indicator 268. In those cases, the result of dropping the indicator at position A or B is shown as the second table 270. In another case, the indicator 264 is moved to rank j+1 if it is dropped or placed at a position C between the second indicator 268 and the highest-ranked indicator of the third sequence 269. The latter case is shown as the third table 280. If the indicator 264 is dropped at position B, i.e., onto the second indicator 268, or at a position approximately equidistant between two indicators (e.g., $T_{j-1}$ and $T_{j+1}$), then the result may be either the arrangement of table 270 or 280, depending on, e.g., a configuration option, a user preference setting, or some other value.

In one aspect, in the case where the first indicator's rank is changed to rank j, the first indicator $T_i$ 264 is displayed at the initial position of the second indicator $T_j$ 268, as shown in a second table 270 of FIG. 2B. The ranking values of the intervening indicators (i.e., the indicators between a second position defined by the initial position of the second indicator $T_j$ and a first position defined by the initial position of the first indicator $T_i$) are decreased by one ranking level, so that the intervening indicators move up by one position, as shown in the second table 270.

In the table 270, the first indicator $T_i$ 276 occupies the position with ranking=j−1, one ranking level above the second indicator $T_j$ 278. The newly-positioned second sequence 274 occupies rankings one level higher (i.e., one value less) than the initially-positioned second sequence 266. In another example, shown in table 280, the first indicator $T_i$ 288 occupies the position with ranking=j previously occupied by the second indicator $T_j$ 268, and $T_j$ has been moved up by one position, along with the second sequence 284.

The highest-ranked indicator $T_{i+1}$ 267 of the second sequence 266, which is also referred to herein as a third indicator, now occupies (in the second table 270 and the third table 280) the initial position of the first indicator $T_i$ 264, i.e., the first position, at ranking=i, which was vacated by the first indicator $T_i$ 264.

Figure 3A:
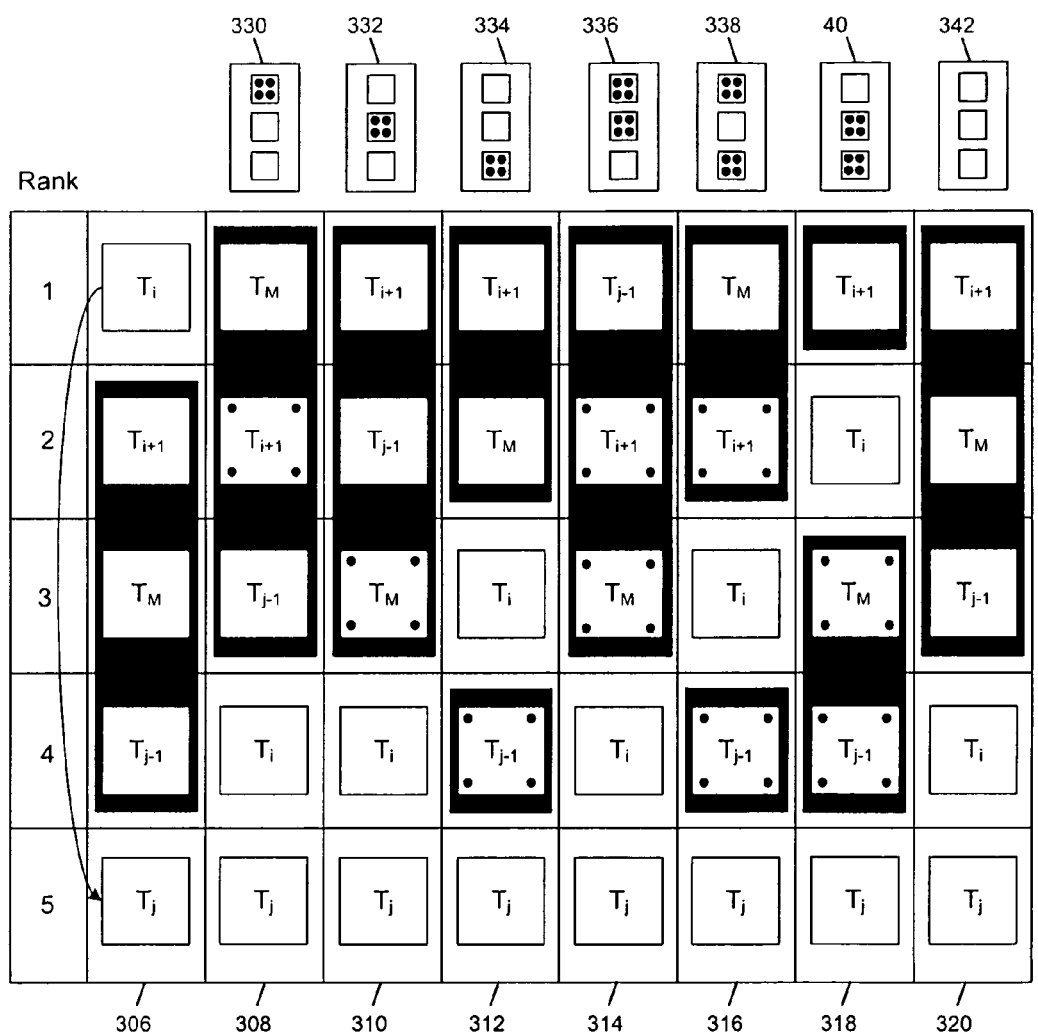
FIGS. 3A-3B illustrate indicator movement with bypassing of fixed indicators accordance with embodiments of the invention.
Figure 3B:
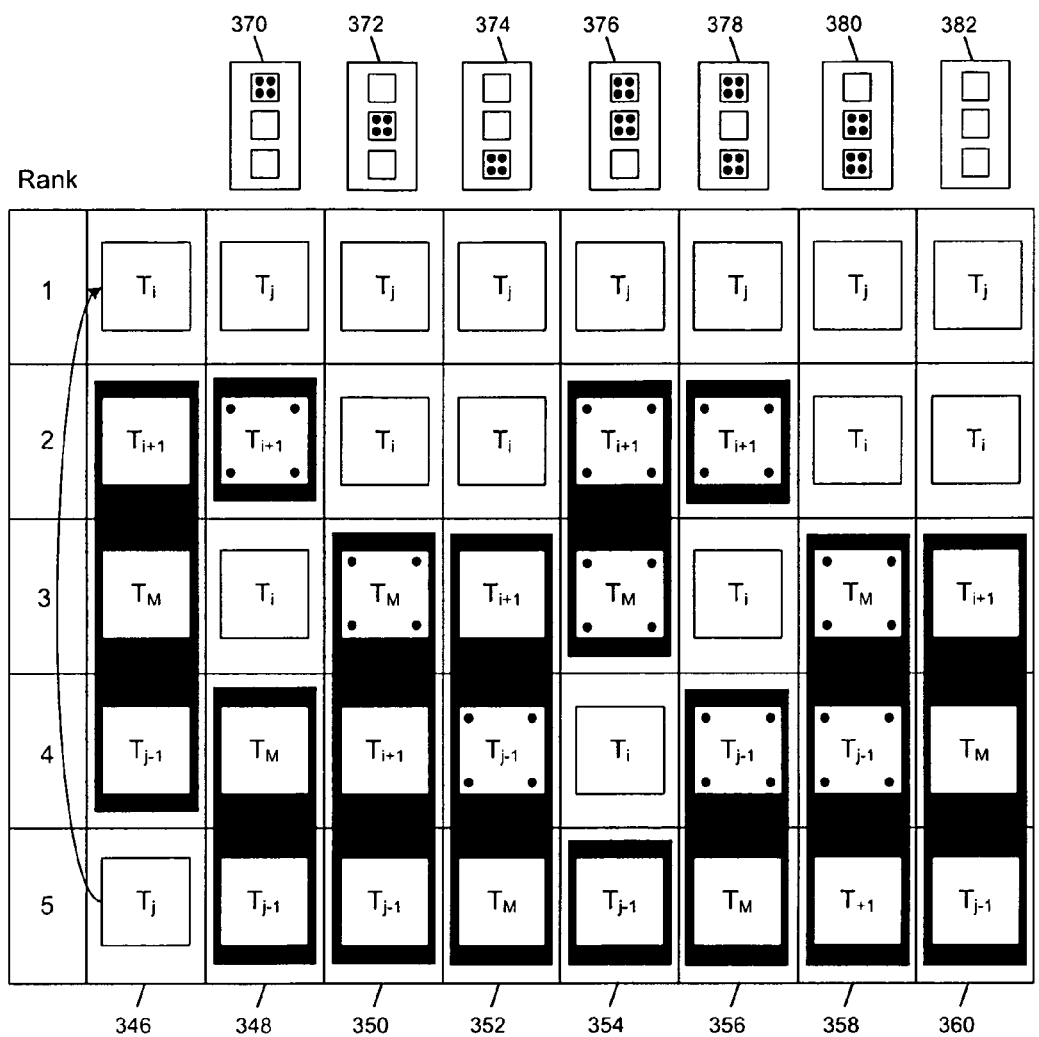

FIGS. 3A and 3B illustrate movement of non-locked predicted indicators in situations where one or more of the intervening indicators in the sequence between the first and second indicator are "locked" into fixed positions that are bypassed in accordance with embodiments of the invention. Locked indicators are shown with dots in the corners of the squares that represent the indicators. As shown in FIG. 3A, the indicators that have not been locked into fixed positions, referred to herein as "non-fixed" indicators, move as described above with reference to FIGS. 2A and 2B, except that the non-fixed indicators pass the fixed indicators. Indicators may be locked for a number of reasons. For example, after a game has been played, or game play has at least begun, a predicted outcome for the game may be locked into the last position it occupied in the table prior to the game. After a game's results are known, there is no need to adjust predictions for that game's outcome, so the predicted outcome indicator for that game is locked into place. In other examples, the predicted outcome indicator may be removed from the table as an alternative to being locked. A user may also lock an indicator, for example, to keep the indicator at a constant position in the ranking. An indicator locked by a user may subsequently be unlocked by the user.

In one aspect, since the positions of locked indicators do not change, the re-ranking operations described above with reference to FIGS. 2A and 2B do not affect the ranking if either the first or second indicator, or both, e.g., the indicator(s) selected to be re-ranked, are locked. Furthermore, if all of the intervening indicators in the sequence between the first and second indicators are locked, then the sequence does not move, and the re-ranking operation simply swaps the positions of the first and second indicators in the ranking. The intervening sequences in the examples of FIGS. 3A and 3B include at least three indicators, one or two of which may be locked FIG. 3A illustrates the case in which the rank of the first indicator is less than the rank of the second indicator. An initial configuration of indicators is shown in column 306. In the example shown, a user selects the first indicator $T_i$ (at rank 1) and moves it to the region that corresponds to rank 5. In accordance with case A of FIG. 2B, the first indicator $T_i$ moves to the position "above" the second indicator $T_j$ at rank 5, so that $T_i$'s new position corresponds to rank 4. If none of the intervening indicators $T_{i+1}$, $T_m$, $T_{j-1}$ (where $T_m$ is an abbreviation for the possibly empty sequence of indicators $T_{i+2}, \ldots, T_{j-2}$) are locked, then indicator $T_i$ moves to rank 5, replacing $T_j$, which moves up one ranking level along with the intervening indicators, so that the upper intervening indicator $T_{i+1}$ becomes the top-ranked indicator, as shown in column 320. Note that the indicator $T_m$ represents zero or more indicators between $T_{i+1}$ and $T_{j-1}$. Alternately, the first indicator $T_i$ may move to the space occupied by the second indicator $T_j$, and $T_j$ may move up into the space vacated by the lower intervening indicator, depending on the region of rank 5 on which $T_i$ is dropped, or on configuration settings.

Column 308 illustrates the arrangement of indicators generated by re-ranking $T_i$ from rank 1 to rank 4 when the indicator $T_{i+1}$ at rank 2 is locked into a fixed position. When such fixed indicators are present, the re-ranking is performed by applying the re-ranking method illustrated in FIG. 2B, with the exception that fixed indicators do not move, and non-fixed indicators bypass fixed indicators that are in positions to which the non-fixed indicators should be moved according to the method of FIG. 2B. A non-fixed indicator bypasses a fixed indicator by moving past the fixed indicator to the position of the first non-fixed indicator past (in this example, above) the fixed indicator. The locked indicator is the upper indicator in the intervening sequence between the first indicator at rank 1 and the second indicator at rank 5, as shown in box 330. Indicator $T_i$ moves to rank 4, $T_j$ remains at rank 5, and the non-fixed indicators in the intervening sequence, $T_m$ and $T_{j-1}$, move up by at least one rank, or by more than one rank as necessary to bypass the fixed indicator(s). $T_m$ moves up from rank 3 to rank 1, bypassing the fixed indicator $T_{i+1}$ at rank 2, into the space vacated by $T_i$. $T_{j-1}$ moves up from rank 4 to rank 3, into the space vacated by $T_m$.

Column 310 illustrates the arrangement of indicators generated by re-ranking $T_i$ from rank 1 to rank 4 when the indicator $T_m$ at rank 3 is locked. The locked indicator is the middle indicator in the intervening sequence between the first and second indicators, as shown in box 332. Indicator $T_i$ moves to rank 4, $T_j$ remains at rank 5, and the non-fixed indicators in the intervening sequence, $T_{i+1}$ and $T_{j-1}$, move up by at least one rank, or more as necessary to bypass the fixed indicator(s). $T_{i+1}$ moves up by one rank into the space vacated by $T_i$, and $T_{j-1}$ moves up from rank 4 to rank 2, bypassing the fixed indicator $T_m$ at rank 3, into the space vacated by indicator $T_{i+1}$.

Column 312 illustrates the arrangement of indicators generated in response to a request to re-rank $T_i$ from rank 1 to rank 4 when the indicator $T_{j-1}$ at rank 4 is locked. The locked indicator is the lower indicator in the intervening sequence between the first and second indicators, as shown in box 334. Indicator $T_i$ cannot move to rank 4 because the indicator at rank 4 is locked. Therefore, $T_i$ bypasses rank 4, and moves to rank 3, which is vacated by indicator $T_m$, which moves to rank 2, which is in turn vacated by block $T_i$, which moves to the space at rank 1 vacated by $T_i$.

Column 314 illustrates the arrangement of indicators generated in response to a request to re-rank $T_i$ from rank 1 to rank 4 when the indicators $T_{i+1}$ and $T_m$ at ranks 2 and 3, respectively, are locked. The locked indicators are the upper and middle indicators in the intervening sequence between the first and second indicators, as shown in box 336. Indicator $T_i$ moves to rank 4, which is vacated by indicator $T_{j-1}$, which moves up as necessary to bypass the locked indicators. In particular, indicator $T_{j-1}$ moves up past the locked indicators in ranks 2 and 3 to arrive at rank 1, in the space vacated by indicator $T_i$.

Column 316 illustrates the arrangement of indicators generated in response to a request to re-rank $T_i$ from rank 1 to rank 4 when the indicators $T_{i+1}$ and $T_{j-1}$ at ranks 2 and 4, respectively, are locked. The locked indicators are the upper and lower indicators in the intervening sequence between the first and second indicators, as shown in box 338. Indicator $T_i$ cannot move to rank 4 because the indicator at rank 4 is locked. Indicator $T_i$ therefore moves up from rank 4 as necessary (e.g., by the minimum number of positions necessary) to bypass the locked indicators. Indicator $T_i$ moves up past the locked indicators at rank 4 to arrive at rank 3, which is vacated by $T_m$, which moves up as necessary to bypass the locked indicator at rank 2, to arrive at rank 1, in the space vacated by $T_i$.

Column 318 illustrates the arrangement of indicators generated in response to a request to re-rank $T_i$ from rank 1 to rank 4 when the indicators $T_m$ and $T_{j-1}$ at ranks 3 and 4, respectively, are locked. The locked indicators are the middle and lower indicators in the intervening sequence between the first and second indicators, as shown in box 340. Indicator $T_i$ cannot move to rank 4 because the indicator at rank 4 is locked. Indicator $T_i$ therefore moves up from rank 4 as necessary to bypass the locked indicators. Indicator $T_i$ moves up past the locked indicators at ranks 3 and 4 to arrive at rank 2, which is vacated by $T_i$, which moves up by one rank into the space at rank 1 vacated by $T_i$.

FIG. 3B illustrates the case in which the rank of the first indicator is greater than the rank of the second indicator. An initial configuration of indicators is shown in column 346. A user selects the first indicator $T_j$ (at rank 5) and moves it to the region that corresponds to rank 1. If none of the intervening indicators $T_{i-1}$, $T_m$, $T_{j-1}$ are locked, then indicator $T_j$ moves to rank 1, replacing $T_i$, which moves down one ranking level along with the intervening indicators, so that the lower intervening indicator $T_{j-1}$ moves to rank 5, as shown in column 360.

Column 348 illustrates the arrangement of indicators generated in response to a request to re-rank indicator $T_j$ from rank 5 to rank 1 when the indicator $T_{i+1}$ at rank 2 is locked. When fixed indicators are present, the re-ranking is performed by applying the re-ranking method illustrated in FIG. 2A, with the exception that fixed indicators do not move, and non-fixed indicators bypass fixed indicators that are in positions to which the non-fixed indicators should be moved according to the method of FIG. 2A. A non-fixed indicator bypasses a fixed indicator by moving past the fixed indicator to the position of the first non-fixed indicator after (in this example, below) the fixed indicator. The locked indicator $T_{i+1}$ is the upper indicator in the intervening sequence between the first and second indicators, as shown in box 370. Indicator $T_j$ moves to rank 1, which is vacated by indicator $T_i$, which moves down by the number of ranks necessary to bypass the fixed indicator(s). In this example, $T_i$ moves down from rank 1 to rank 3, bypassing the fixed indicator $T_{i+1}$ at rank 2. Rank 3 is vacated by indicator $T_m$, which moves down into the space at rank 4 vacated by indicator $T_{j-1}$, which moves down into the space at rank 5 vacated by indicator $T_j$.

Column 350 illustrates the arrangement of indicators generated in response to a request to re-rank indicator $T_j$ from rank 5 to rank 1 when the indicator $T_m$ at rank 3 is locked. The locked indicator $T_m$ is the middle indicator in the intervening sequence between the first and second indicators, as shown in box 372. Indicator $T_j$ moves to rank 1, which is vacated by indicator $T_i$, which moves down by one rank to rank 2. Rank 2 is vacated by indicator $T_i$, which moves down by the number of ranks necessary to bypass the fixed indicator(s). In this example, $T_{i+1}$ moves down from rank 2 to rank 4, bypassing the fixed indicator $T_m$ at rank 3. Rank 4 is vacated by $T_{j-1}$, which moves down to the space at rank 5 vacated by indicator $T_j$, which moves into the space at rank 1 vacated by indicator $T_i$.

Column 352 illustrates the arrangement of indicators generated in response to a request to re-rank indicator $T_j$ from rank 5 to rank 1 when the indicator $T_{j-1}$ at rank 4 is locked. The locked indicator $T_j$ is the lower indicator in the intervening sequence between the first and second indicators, as shown in box 374. Indicator $T_i$ moves to rank 1, which is vacated by indicator $T_i$, which moves down by one rank to rank 2. Rank 2 is vacated by indicator $T_{i+1}$, which moves down one rank to the space at rank 3 vacated by indicator $T_m$. $T_m$ moves down, but the indicator at rank 4 is locked, so $T_m$ bypasses the locked indicator at rank 4, and moves into the space at rank 5 vacated by indicator $T_j$.

Column 354 illustrates the arrangement of indicators generated in response to a request to re-rank indicator $T_j$ from rank 5 to rank 1 when the indicators $T_{i+1}$ and $T_m$ at ranks 2 and 3, respectively, are locked. The locked indicators are the upper and middle indicators in the intervening sequence between the first and second indicators, as shown in box 376. Indicator $T_j$ moves to rank 1, which is vacated by indicator $T_i$. $T_i$ moves down, but the indicators at ranks 2 and 3 are locked, so $T_i$ bypasses ranks 2 and 3, and moves into the space at rank 4 vacated by $T_{j-1}$, which moves down one rank to the space at rank 5 vacated by $T_j$.

Column 356 illustrates the arrangement of indicators generated in response to a request to re-rank indicator $T_j$ from rank 5 to rank 1 when the indicators $T_{i+1}$ and $T_{j-1}$ at ranks 2 and 4, respectively, are locked. The locked indicators are the upper and lower indicators in the intervening sequence between the first and second indicators, as shown in box 378. Indicator $T_j$ moves to rank 1, which is vacated by indicator $T_i$. $T_i$ moves down, but the indicator at rank 2 is locked, so $T_i$ bypasses rank 2, and moves into the space at rank 3 vacated by $T_m$, which moves down. Since the indicator at rank 4 is locked, $T_m$ bypasses rank 4 and moves into the space at rank 5 vacated by $T_j$.

Column 358 illustrates the arrangement of indicators generated in response to a request to re-rank indicator $T_j$ from rank 5 to rank 1 when the indicators $T_m$ and $T_{j-1}$ at ranks 3 and 4, respectively, are locked. The locked indicators are the middle and lower indicators in the intervening sequence between the first and second indicators, as shown in box 380. Indicator $T_j$ moves to rank 1, which is vacated by indicator $T_i$. $T_i$ moves down to rank 2, which is vacated by indicator $T_{i+1}$. $T_{i+1}$ moves down, but the indicators at ranks 3 and 4 are locked, so $T_{i+1}$ bypasses ranks 3 and 4, and moves into the space at rank 5 vacated by $T_j$.

FIG. 4A illustrates a re-ranking operation in accordance with embodiments of the invention. The re-ranking operation changes the rank of a first predicted outcome indicator $T_3$ to a second rank, wherein the second rank is numerically less than (but ranked "higher" than) the initial rank. Initially, i.e., before the re-ranking operation, a table 402 displays five predicted outcome indicators, which are labeled $T_0$, $T_1$, $T_2$, $T_3$, and $T_4$, and ranked at ranks 1, 2, 3, 4, and 5, respectively. A re-ranking operation is initiated to move $T_3$ from rank 4 to rank 2, as shown by the arrow in table 402 from $T_3$ to $T_1$. The arrow represents a drag and drop operation, or a selection of $T_3$ followed by a selection of $T_1$, or any other user interface interaction that selects $T_3$ as the indicator to move, selects rank 2 (or, correspondingly, indicator $T_1$) as the new rank for $T_3$. An intermediate stage of the re-ranking operation is shown in table 404. The indicator $T_3$ has been moved to the region of rank 2, and indicators $T_1$ and $T_2$ are both shown moving down by one rank. These re-rankings may be shown in the user interface as animated movement of the indicators from their initial positions to their new positions, or may be shown simply by changing the display from the configuration shown in table 402 to the configuration shown in table 406. For example, indicator $T_3$ may be shown moving from rank 4 to rank 2, and indicators $T_1$ and $T_2$ may be shown moving down by one level. The result of the re-ranking operation is shown in box 406, in which $T_3$ has moved to rank 2, $T_1$ has moved to rank 3, and $T_2$ has moved to rank 4.

FIG. 4B illustrates a re-ranking operation in accordance with embodiments of the invention. The re-ranking operation changes the rank of a first predicted outcome indicator $T_1$ to a second rank, wherein the second rank is numerically greater than (but ranked "lower" than) the initial rank. A re-ranking operation is initiated to move $T_1$ from rank 2 to rank 4, as shown by the arrow in table 410 from $T_1$ to $T_3$. As in FIG. 4A, the arrow represents a user interface interaction specifying that $T_1$ is to be moved to rank 4. An intermediate stage of the re-ranking operation is shown in table 412. The indicator $T_1$ has been moved to the region of rank 4, and indicators $T_2$ and $T_3$ are both shown moving up by one rank. The re-rankings may be shown as animated movement or by changing the display from the configuration shown in table 410 to the configuration shown in table 414. For example, indicator $T_1$ may be shown moving from rank 2 to rank 4, and indicators $T_2$ and $T_3$ may be shown moving up by one level. The result of the re-ranking operation is shown in box 414, in which $T_1$ has moved to rank 4, $T_2$ has moved to rank 2, and $T_3$ has moved to rank 3.

FIG. 5A illustrates a re-ranking operation with a fixed indicator in accordance with embodiments of the invention. A table 502 displays five predicted outcome indicators, labeled $T_0$ through $T_4$ and ranked 1-5, respectively. $T_2$ is a locked indicator, as shown by the dots in the corners of the indicator $T_2$. The dots are shown as an example, and other graphical features may be used as alternatives to the dots to indicate that an indicator is locked. A re-ranking operation is initiated to move $T_3$ from rank 4 to rank 2, as shown by the arrow in table 502 from $T_3$ to $T_1$. An intermediate stage of the re-ranking operation is shown in table 504. The indicator $T_3$ has been moved to the region of rank 2, and indicator $T_1$ is shown vacating rank 2 and moving down to a lower rank. $T_2$ does not move because it is locked, so $T_1$ bypasses $T_2$ and moves to the next available space after rank 3, which is at rank 4. The result of the re-ranking operation is shown in box 506, in which $T_3$ has moved to rank 2, $T_1$ has moved to rank 4, and $T_2$ has not moved.

FIG. 5B illustrates a re-ranking operation with a fixed indicator in accordance with embodiments of the invention. A table 510 displays five predicted outcome indicators, labeled $T_0$ through $T_4$ and ranked 1 through 5, respectively. $T_2$ is a locked indicator, as shown by the dots in the corners of the indicator $T_2$. A re-ranking operation is initiated to move $T_1$ from rank 2 to rank 4, as shown by the arrow in table 510 from $T_1$ to $T_3$. An intermediate stage of the re-ranking operation is shown in table 512. The indicator $T_1$ has been moved to the region of rank 4, and indicator $T_3$ is shown vacating rank 4 and moving up to a higher rank. $T_2$ does not move because it is locked, so $T_3$ bypasses $T_2$ and moves to the next available space after rank 3, which is at rank 2. The result of the re-ranking operation is shown in table 514, in which $T_1$ has moved to rank 4, $T_3$ has moved to rank 2, and $T_2$ has not moved.

Figure 6:
FIG. 6 illustrates a user interface for assigning confidence points to predicted outcomes of sports games in accordance with embodiments of the invention.

FIG. 6 illustrates a user interface for assigning confidence points to predicted outcomes of sports games in accordance with embodiments of the invention. The user interface 600 displays a ranking table 601 that includes predicted outcome indicators 610, 612, 614. The ranking table 601 is similar to the ranking table 101 of FIG. 1A. The user interface 600 may display details about predicted outcome indicators. The details may be, for example, information about a team, a game, a date, or about any other entity displayed in the table 601. Details about a selected team are displayed in a pop-up window 608 in response to, for example, a user positioning a cursor or mouse pointer over a sports team name. The details may include an icon that represents a selected team and statistics for the team, such as the percentage of users who picked the team as the predicted winner of the game, and the average confidence score assigned to the team by users. The user interface 600 also displays user score information 604, which may include a score generated for the user based upon his or her correct picks, a ranking of the user relative to other users, and the number of correct predictions made by the user. An advertisement 606 may also be displayed. A Submit Picks button causes confidence scores associated with the teams to be submitted to a judging authority, which will generate a score for the user based upon the actual (e.g., real-life) outcomes of the games.

Figure 7:
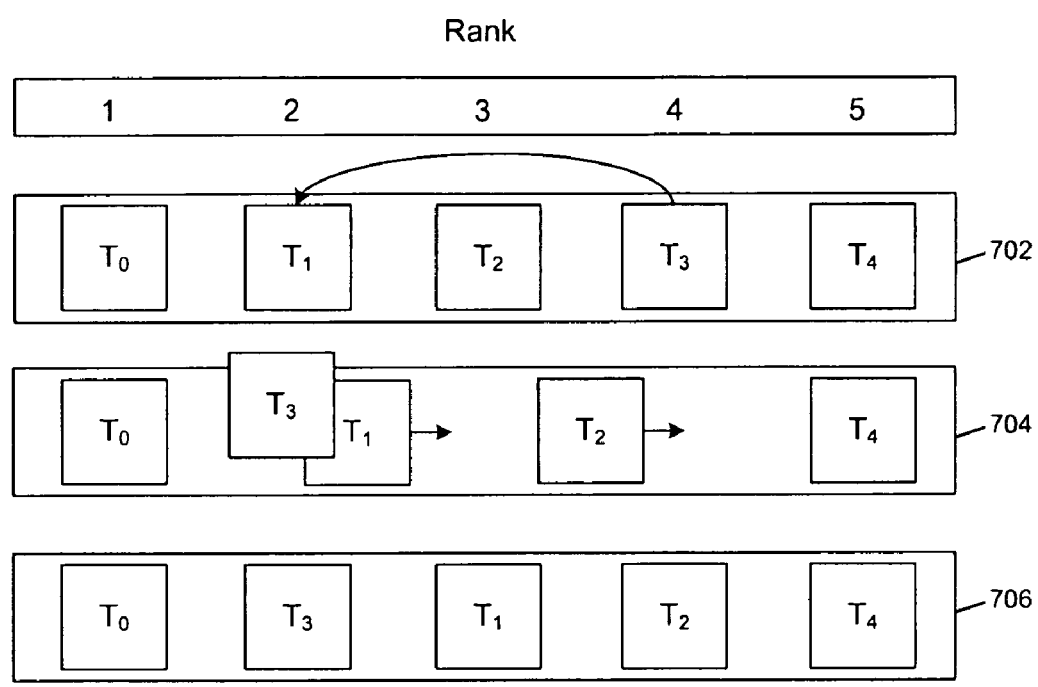
FIG. 7 illustrates horizontally-oriented ranking tables in accordance with embodiments of the invention.

FIG. 7 illustrates horizontally-oriented ranking tables in accordance with embodiments of the invention. Although the ranking tables used in other examples herein have a particular spatial orientation in the graphical user interface, other orientations and configurations are possible, as long as the table represents a ranking order. Thus, the ranking table may be oriented horizontally, diagonally, circularly (with an identified highest ranking area), and the like. The tables 702, 704, 706 are oriented horizontally, and the prediction indicators move in horizontal directions. In table 702, a re-ranking operation is initiated to move indicator $T_3$ from rank 4 to rank 2, as shown by the arrow from $T_3$ to $T_1$. An intermediate stage of the re-ranking operation is shown in table 704. The indicator $T_3$ has been moved to the region of rank 2, and indicator $T_1$ is shown vacating rank 2 and moving right to the next lower rank. The intervening indicator $T_2$ also moves right to the next lower rank. The result of the re-ranking operation is shown in table 706, in which $T_3$ has moved to rank 2, $T_1$ has moved to rank 3, and $T_2$ has moved to rank 4.

Figure 8A:
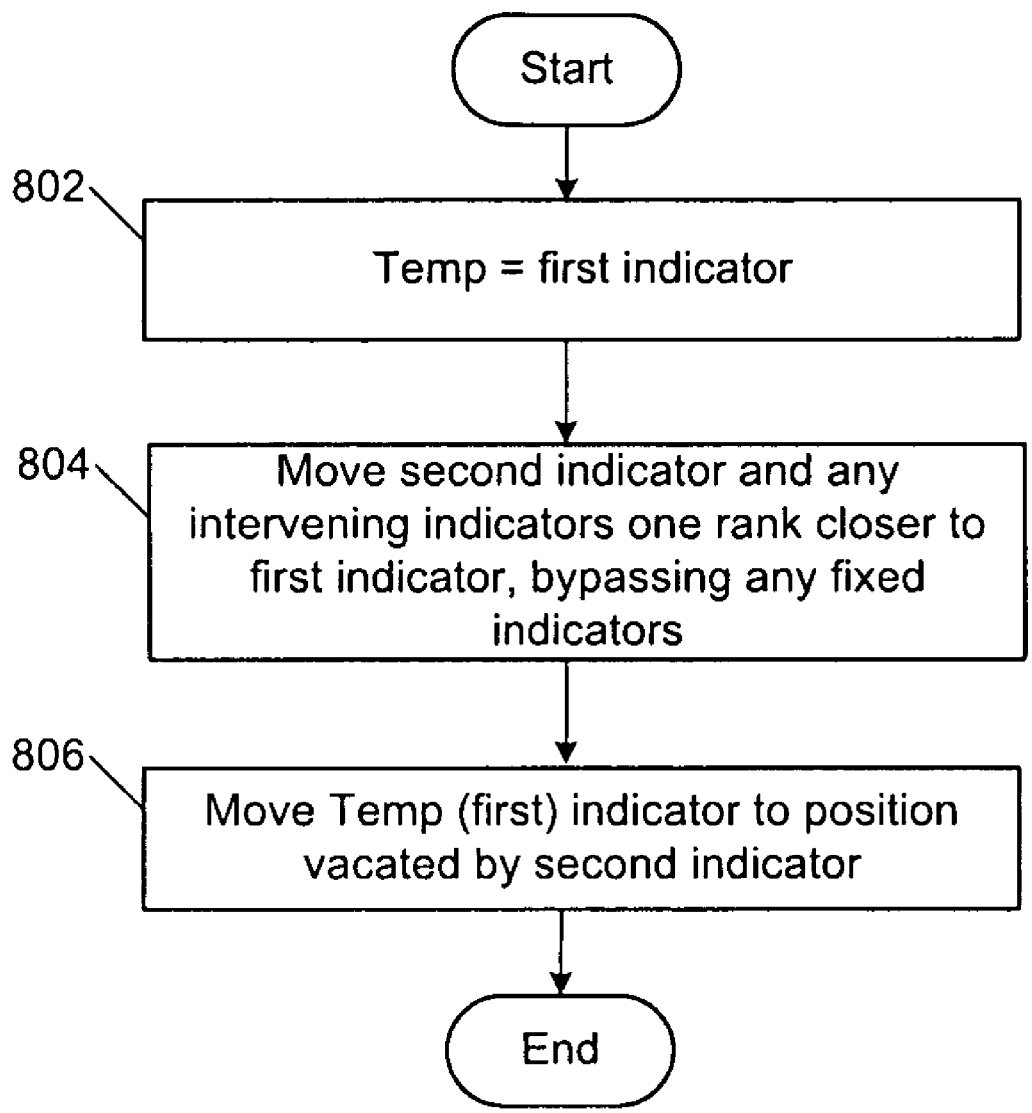
FIG. 8A is an illustrative flow diagram of a process for re-ranking a predicted outcome indicator in accordance with embodiments of the invention.
Figure 8B:
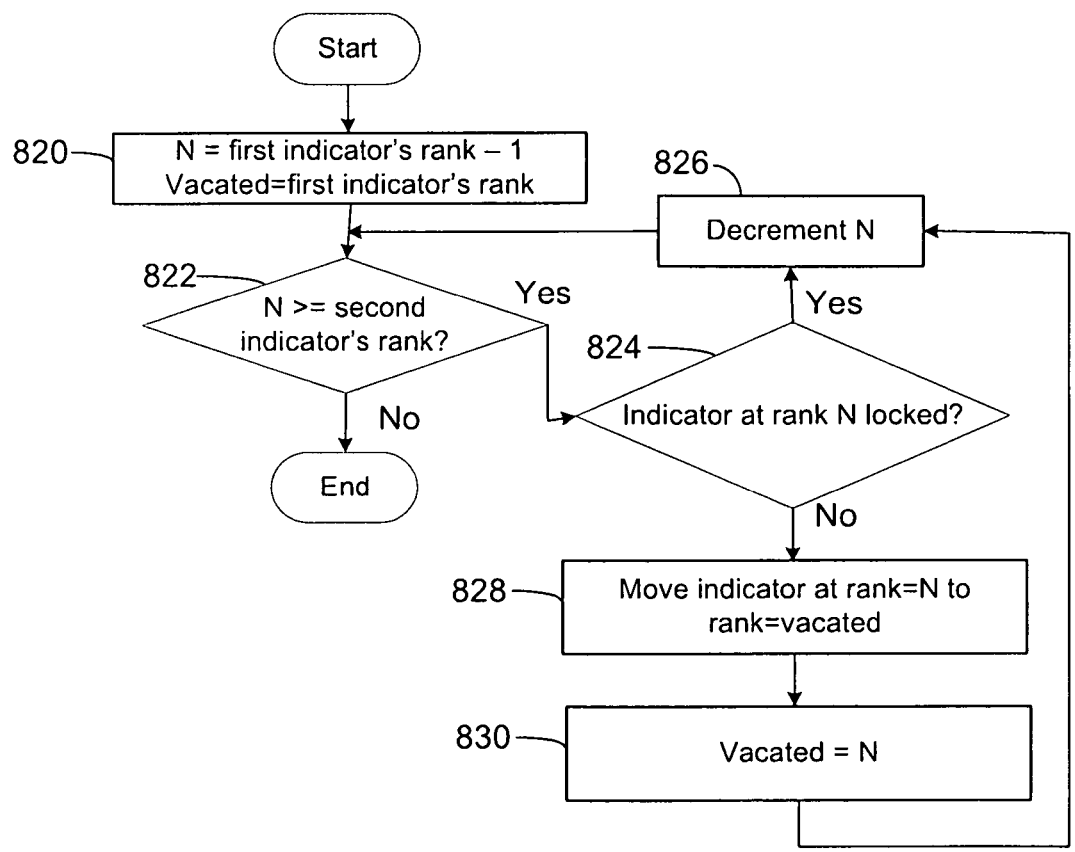
FIG. 8B is an illustrative flow diagram of a process for moving a predicted outcome indicator to a next rank while bypassing fixed indicators in accordance with embodiments of the invention.

FIG. 8A is an illustrative flow diagram of a process for re-ranking a predicted outcome indicator in accordance with embodiments of the invention. The process illustrated in FIG. 8A is implemented by, for example, control logic such as software instructions that when executed by a processor in a computer system cause the processor to perform the process. The process illustrated in FIG. 8A receives a first indicator, e.g., the indicator being dragged in a drag and drop operation, and a second indicator, e.g., the destination indicator (corresponding to the destination rank) in the drag and drop operation. The first and second indicators should not be fixed indicators. See FIGS. 2A and 2B for illustrations of the re-ranking process in two cases. The process begins at block 802 by storing the first indicator (or a reference or pointer to the first indicator, if the indicators are accessed by references or pointers) in a variable named Temp. Block 804 moves the second indicator and any intervening indicators (e.g., the sequence 208 in FIG. 2A or the sequence 266 in FIG. 2B) one rank closer to the first indicator, while bypassing, e.g., skipping over, any fixed indicators. A process for bypassing fixed indicators, which may be invoked by block 804, is shown in FIG. 8B. Block 806 moves the indicator previously stored in the Temp variable to the position vacated by the second indicator.

FIG. 8B is an illustrative flow diagram of a process for moving a predicted outcome indicator to a next rank while bypassing fixed indicators in accordance with embodiments of the invention. The process illustrated in FIG. 8A is implemented by, for example, control logic such as software instructions that when executed by a processor in a computer system cause the processor to perform the process. The process of FIG. 8B may be invoked by, for example, the process of FIG. 8A, and receives the rank values of the first and second indicators as input. The process of FIG. 8A moves indicators down by one or more positions (as necessary) to the next available rank, as shown in FIGS. 2A and 3B. The process may be modified to move indicators up by one more positions to a next available rank, as shown in FIGS. 2B and 3A, e.g., by changing the increment operations shown to decrement operations, and changing the greater than or equal comparison in block 822 to a less than comparison. For the processes shown in FIGS. 8A and 8B, the rank positions are numbered starting at 1 for the top rank, with the rank numbers increasing as the rank decreases (i.e., rank number 1 corresponds to the highest rank, and rank number 32 corresponds to a lower rank). Other numbering conventions may be used with appropriate modifications to the comparison and increment operations in FIGS. 8A and 8B.

In one example, the indicator movement process of FIG. 8B moves the indicators positioned between the first and second indicators by at least one ranking level toward the first indicator, to occupy the space vacated by the first indicator. As described above, the first indicator may replace the second indicator or may replace an indicator adjacent to the second indicator. The second indicator and the intervening indicators located between the initial positions of the first and second indicators move by at least one ranking level toward the initial position (i.e., initial rank) of the first indicator. The process scans through a list (or other data structure, such as an array) that represents the indicators or rankings. The process starts scanning at the second indicator, which is, for example, the bottom indicator in the list, and scans toward the first indicator, e.g., the top indicator in the list shown in FIG. 2A. The process moves each non-locked indicator by at least one ranking level toward the initial position of the first indicator, does not move locked indicators, and moves non-locked indicators past locked indicators that occupy positions to which the un-blocked indicators are initially to be moved. The process begins at block 820 by assigning initial values to the variables N and Vacated. N represents the rank of the indicator being processed, and Vacated represents the initial rank of the indicator most recently moved. N is initialized to the first indicator's rank minus 1, and Vacated is initialized to the first indicator's rank. Block 822 determines if N is greater than the second indicator's rank, so that the scanning process will stop at the second indicator. If N is less than the second indicator's rank, the process ends. Otherwise, block 824 determines if the indicator at rank N is locked, e.g., by checking a locked attribute associated with the indicator at rank N. If the indicator at rank N is locked, then the process moves on to the next indicator by decrementing N at block 826 and executing block 822 again. If block 824 determines that the indicator at rank N is not locked, then block 828 moves the indicator at rank N to the rank specified by the Vacated variable, and block 830 sets the Vacated variable to N, i.e., the rank from which the indicator was moved in block 828. Block 826 then decrements N, and block 822 is invoked again to repeat the process until N passes the second indicator. Movement of the indicator in the graphical user interface may be implemented by, for example, updating a data structure with the new ranking position of the indicator at N, or updating the coordinates of the indicator, or the like.

Figure 9:
FIG. 9 illustrate a user interface for assigning confidence points to predicted outcomes of sports games in accordance with embodiments of the invention.

FIG. 9 illustrates a user interface for assigning confidence points to predicted outcomes of sports games in accordance with embodiments of the invention. The user interface 900 illustrated in FIG. 9 is similar to the user interface 600 illustrated in FIG. 6, with the exception that in FIG. 9, the confidence points values for each predicted outcome are displayed at the same vertical position as the corresponding predicted outcome, to create a different visual effect.

Figure 10:
FIG. 10 illustrate a user interface for assigning confidence points to predicted outcomes of sports games in accordance with embodiments of the invention.

FIG. 10 illustrates a user interface for assigning confidence points to predicted outcomes of sports games in accordance with embodiments of the invention. The user interface 1000 illustrated in FIG. 10 is similar to the user interface 900 illustrated in FIG. 9, with the exception that in FIG. 10, the confidence points values for each predicted outcome may be selected from a menu of confidence points (e.g., 1 through 32) in a column 1002 associated with the predicted outcome. The menu selection user interface of FIG. 10 may be provided as an alternative to, or in addition to, the selection-based or drag and drop interfaces described above with respect to FIGS. 1A-1C. In one example, a user's action of changing the confidence points value in a confidence points menu causes the rankings to be updated accordingly. For example, if the confidence points value displayed in the menu associated with the Rose Bowl team is changed from 2 to 7, then re-ranking will occur as described herein with respect to FIGS. 1A-1C. For example, the Las Vegas indicator will move from rank 7 to rank 2, and the indicators that were initially at ranks 2 through 6 will each move down by one position. In another example, then the Rose Bowl outcome indicator will exchange positions with the indicator at rank (i.e., position) 7 (Las Vegas), so that the Las Vegas indicator is displayed at rank 2, and the Rose Bowl indicator is displayed at rank 7.

Figure 11:
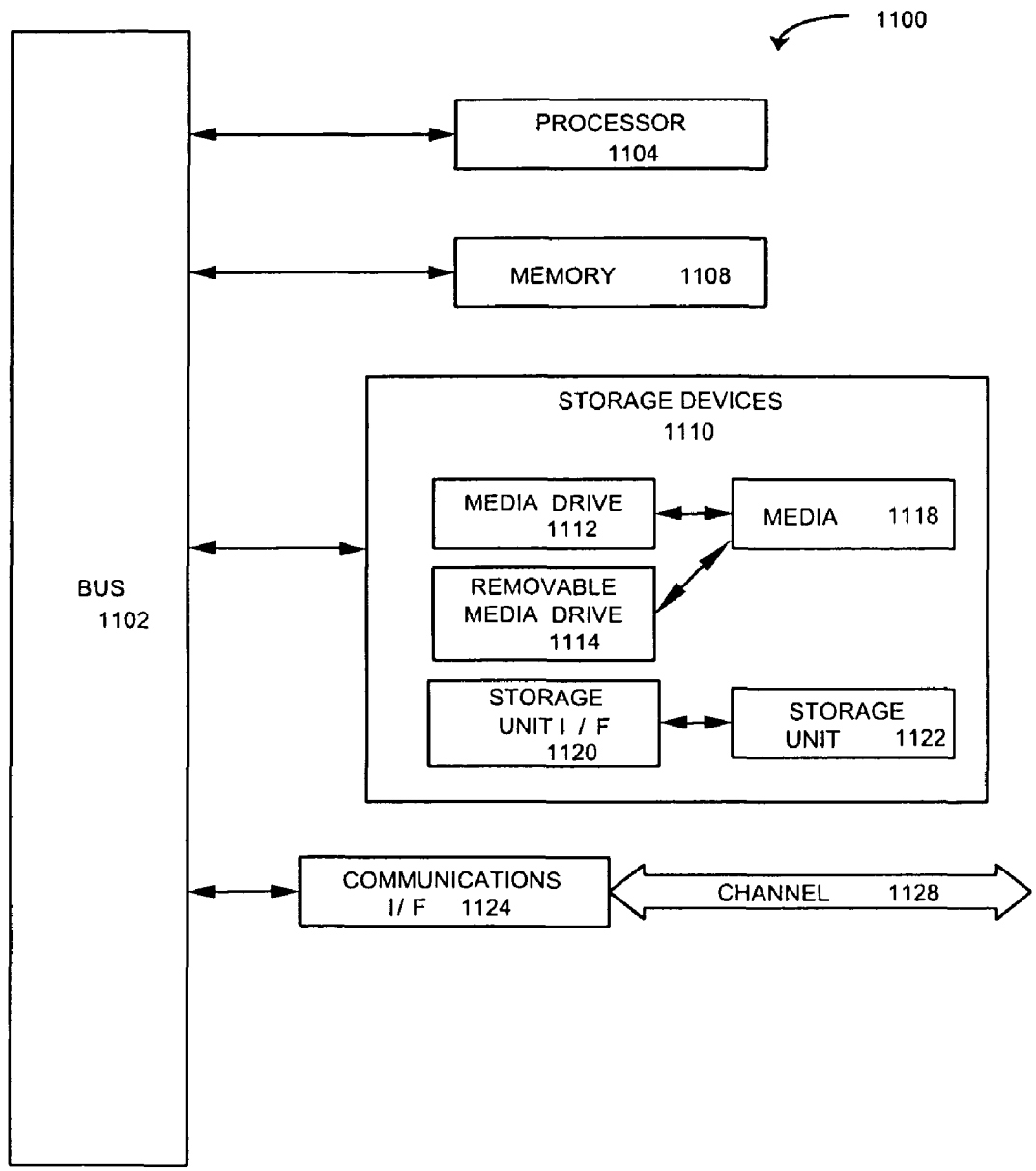
FIG. 11 illustrates a typical computing system that may be employed to implement processing functionality in embodiments of the invention.

FIG. 11 illustrates a typical computing system 1100 that may be employed to implement processing functionality in embodiments of the invention. Computing systems of this type may be used in clients and servers, for example. Those skilled in the relevant art will also recognize how to implement the invention using other computer systems or architectures. Computing system 1100 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1100 can include one or more processors, such as a processor 1104. Processor 1104 can be implemented using a general or special purpose processing engine such as, for example, a microprocessor, microcontroller or other control logic. In this example, processor 1104 is connected to a bus 1102 or other communication medium.

Computing system 1100 can also include a main memory 1108, such as random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory ("ROM") or other static storage device coupled to bus 1102 for storing static information and instructions for processor 1104.

The computing system 1100 may also include information storage system 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1118 may include, for example, a hard disk, floppy disk, magnetic tape, optical disk, CD or DVD, or other fixed or removable medium that is read by and written to by media drive 1112. As these examples illustrate, the storage media 1118 may include a computer-readable storage medium having stored therein particular computer software or data.

In alternative embodiments, information storage system 1110 may include other similar components for allowing computer programs or other instructions or data to be loaded into computing system 1100. Such components may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a USB port), a PCMCIA slot and card, etc. Software and data transferred via communications interface 1124 are in the form of signals which can be electronic, electromagnetic, optical or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 1108, storage device 1118, or storage unit 1122. These and other forms of computer-readable media may be involved in storing one or more instructions for use by processor 1104, to cause the processor to perform specified operations. Such instructions, generally referred to as "computer program code" (which may be grouped in the form of computer programs or other groupings), when executed, enable the computing system 1100 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1100 using, for example, removable storage drive 1114, drive 1112 or communications interface 1124. The control logic (in this example, software instructions or computer program code), when executed by the processor 1104, causes the processor 1104 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate. It must also be noted that, as used in this specification and the appended claims, the singular forms "a," "an" and "the" include plural referents unless the context clearly dictates otherwise.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method comprising:
    causing, by a computing device, display in a graphical user interface of an ordered list of at least two confidence score indicators, wherein each confidence score indicator is associated with a sports game, a predicted outcome of the game, and a rank that corresponds to a degree of confidence in the predicted outcome, and each confidence score indicator is displayed at a position that corresponds to the rank associated with the indicator;
    receiving, by the computing device, selection from the graphical user interface of a first confidence score indicator and a second confidence score indicator selected from a first position and a second position, respectively, in the ordered list;
    causing, by the computing device, the first confidence score indicator to move to the second position;
    causing, by the computing device, the second confidence score indicator to move by at least one rank in a direction toward the first position to a third position, wherein the third position is adjacent to the second position; and
    causing, by the computing device, one or more confidence score indicators located between the first position and the second position to move by at least one rank toward the first position, wherein the one or more confidence score indicators include a third confidence score indicator that moves from a position adjacent the first position to the first position.

2. The method of claim 1, further comprising:
    fixing, by the computing device, a ranking of a fixed-rank confidence score indicator that corresponds to a selected game, so that the ranking of the fixed-rank confidence score indicator subsequently remains constant and does not change in response to subsequent changes of rankings of other confidence score indicators in the list.

3. The method of claim 2, wherein the selected game is a game for which play has occurred at a time in the past.

4. The method of claim 1, wherein each confidence score indicator includes a name of a sports game and a name of a fantasy sports team that is predicted to win the sports game.

5. The method of claim 1, wherein receiving selection from the graphical user interface of the first confidence score indicator comprises receiving a drag and drop command to drag the first confidence score indicator from the first position, and receiving selection of the second confidence sore indicator comprises receiving a drop command to drop the first confidence score indicator at a position associated with the second confidence score indicator.

6. The method of claim 1, wherein the ordered list of at least two confidence score indicators is displayed in a table format, the first and second confidence score indicators are rows in the table, and each row is associated with a unique rank.

7. The method of claim 1, wherein causing a confidence score indicator to move comprises causing the confidence score indicator to be removed from an original position and causing the confidence indicator to be displayed at a new position.

8. A non-transitory computer-readable storage medium comprising program code for:
    causing display in a graphical user interface of an ordered list of at least two confidence score indicators, wherein each confidence score indicator is associated with a sports game, a predicted outcome of the game, and a rank that corresponds to a degree of confidence in the predicted outcome, wherein each confidence score indicator is displayed at a position that corresponds to the rank associated with the indicator;

fixing a ranking of at least one fixed-rank confidence score indicator that corresponds to at least one selected game, thereby creating at least one fixed-rank confidence score indicator, so that the ranking of the at least one fixed-rank confidence score indicator subsequently remains constant and does not change in response to subsequent changes of rankings of non-fixed confidence score indicators in the ordered list;

receiving selection from the graphical user interface of a first confidence score indicator and a second confidence score indicator associated with a first position and a second position, respectively, in the ordered list;

causing the first confidence score indicator to move to the second position;

causing the second confidence score indicator to move by at least one rank in a direction toward the first position to a closest available position relative to the second position; and causing one or more non-fixed confidence score indicators located between the first position and the second position to move by at least one rank toward the first position, wherein the one or more confidence score indicators include a third confidence score indicator that moves from a closest available position relative to the first position to the first position.

9. The non-transitory computer-readable storage medium of claim 8, wherein the at least one selected game is a game for which play has occurred at a time in the past.

10. The non-transitory computer-readable storage medium of claim 8, further comprising program code for receiving selection of the at least one selected game from a user.

11. The non-transitory computer-readable storage medium of claim 8, wherein each confidence score indicator includes a name of a sports game and a name of a fantasy sports team that is predicted to win the at least one selected game.

12. The non-transitory computer-readable storage medium of claim 8, wherein receiving selection from the graphical user interface of the first confidence score indicator comprises receiving a drag and drop command to drag the first confidence score indicator from the first position, and receiving selection of the second confidence sore indicator comprises receiving a drop command to drop the first confidence score indicator at a position associated with the second confidence score indicator.

13. The non-transitory computer-readable storage medium of claim 8, wherein the ordered list of at least two confidence score indicators is displayed in a table format, the first and second confidence score indicators are rows in the table, and each row is associated with a unique rank.

14. A method comprising:
providing, by a computing device, a user interface for displaying a plurality of predicted game outcomes in a ranked order, wherein each predicted game outcome is associated with a rank unique in the plurality of predicted game outcomes, and each predicted game outcome is displayed at a position that corresponds to the outcome's rank;

receiving, by the computing device, selection of a selected predicted game outcome, wherein the selected predicted game outcome is associated with an initial rank;

receiving, by the computing device, selection of a new rank that corresponds to a second predicted game outcome selected from the plurality of predicted game outcomes;

associating, by the computing device, the selected predicted game outcome with the new rank;

associating, by the computing device, at least one intervening predicted outcome ranked between the new rank and the initial rank with a next rank that is at least one ranking level closer to the initial rank, relative to the initial position of the at least one intervening predicted outcome; and associating, by the computing device, the second predicted game outcome with the initial rank.

15. The method of claim 14, further comprising:
fixing, by the computing device, a ranking of a fixed-rank predicted game outcome that corresponds to a selected game, so that the ranking of the fixed-rank predicted game outcome subsequently remains constant and does not change in response to subsequent changes of rankings of other predicted game outcomes in the list.

16. The method of claim 15, wherein the selected game is a game for which play has occurred at a time in the past.

17. The method of claim 14, wherein associating an outcome with a rank comprises changing the ranking of the outcome to the rank.

18. The method of claim 14, further comprising:
displaying, by the computing device, the representation of the selected predicted game outcome at the second position and displaying a representation of the second predicted game outcome at the first position in response to the user dragging a representation of the selected predicted game outcome from a first position associated with the initial rank to a second position associated with the new rank.

19. The method of claim 18, further comprising:
displaying, by the computing device, at least one representation of the at least one intervening predicted outcome at a position associated with the next rank.

20. A system for enabling a user to adjust confidence rankings of predicted outcomes of fantasy sports games, the system comprising:
a computer memory for storing instructions; and
a processor for executing the instructions, the instructions for:
causing display in a graphical user interface of an ordered list of at least two confidence score indicators, wherein each confidence score indicator is associated with a sports game, a predicted outcome of the game, and a rank that corresponds to a degree of confidence in the predicted outcome, and each confidence score indicator is displayed at a position that corresponds to the rank associated with the indicator;

receiving selection from the graphical user interface of a first confidence score indicator and a second confidence score indicator selected from a first position and a second position, respectively, in the ordered list;

causing the first confidence score indicator to move to the second position;

causing the second confidence score indicator to move by at least one rank in a direction toward the first position to a third position, wherein the third position is adjacent to the second position; and causing one or more confidence score indicators located between the first position and the second position to move by at least one rank toward the first position, wherein the one or more confidence score indicators include a third confidence score indicator that moves from a position adjacent the first position to the first position.

21. The system of claim 20, further comprising instructions for:
fixing a ranking of a fixed-rank confidence score indicator that corresponds to a selected game, so that the ranking of the fixed-rank confidence score indicator subsequently remains constant and does not change in response to subsequent changes of rankings of other confidence score indicators in the list.

22. The system of claim 21, wherein the selected game is a game for which play has occurred at a time in the past.

23. The system of claim 20, wherein each confidence score indicator includes a name of a sports game and a name of a fantasy sports team that is predicted to win the sports game.

24. The system of claim 20, wherein receiving selection from the graphical user interface of the first confidence score indicator comprises receiving a drag and drop command to drag the first confidence score indicator from the first position, and receiving selection of the second confidence score indicator comprises receiving a drop command to drop the first confidence score indicator at a position associated with the second confidence score indicator.

25. The system of claim 20, wherein the ordered list of at least two confidence score indicators is displayed in a table format, the first and second confidence score indicators are rows in the table, and each row is associated with a unique rank.

26. The system of claim 20, wherein causing a confidence score indicator to move comprises causing the confidence score indicator to be removed from an original position and causing the confidence indicator to be displayed at a new position.

27. An interface for enabling a user to adjust confidence score values that are assigned to predicted sports game outcomes, the interface comprising:
   a display component for displaying a plurality of predicted game outcomes in a ranked order, wherein each predicted game outcome is associated with a rank unique in the plurality of predicted game outcomes, and each predicted game outcome is displayed at a position that corresponds to the outcome's rank;
   an input component for receiving selection of a selected predicted game outcome, wherein the selected predicted game outcome is associated with an initial rank, and the input component is further operable to receive selection of a new rank that corresponds to a second predicted game outcome selected from the plurality of predicted game outcomes;
   a re-ranking component for associating the selected predicted game outcome with the new rank and associating at least one intervening predicted outcome ranked between the new rank and the initial rank with a next rank that is at least one ranking level closer to the initial rank, relative to the initial position of the at least one intervening predicted outcome,
   the re-ranking component further operable to associate the second predicted game outcome with the initial rank.

28. The interface of claim 27, further comprising:
   a locking component for fixing a ranking of a fixed-rank predicted game outcome that corresponds to a selected game, so that the ranking of the fixed-rank predicted game outcome subsequently remains constant and does not change in response to subsequent changes of rankings of other predicted game outcomes in the list.

29. The interface of claim 28, wherein the selected game is a game for which play has occurred at a time in the past.

30. The interface of claim 28, wherein associating an outcome with a rank comprises changing the ranking of the outcome to the rank.

31. The interface of claim 28, wherein the display component is further operable to display the representation of the selected predicted game outcome at the second position and display a representation of the second predicted game outcome at the first position in response to the user dragging a representation of the selected predicted game outcome from a first position associated with the initial rank to a second position associated with the new rank.

32. The interface of claim 31, wherein the display component is further operable to display at least one representation of the at least one intervening predicted outcome at a position associated with the next rank.

* * * * *